(12) United States Patent
Hickey et al.

(10) Patent No.: US 9,309,345 B2
(45) Date of Patent: Apr. 12, 2016

(54) AROMATIC POLYESTER POLYOLS AND AROMATIC POLYESTER POLYOL BLENDS CONTAINING BIORENEWABLE COMPONENTS AND METHODS OF MAKING

(71) Applicant: Stepan Company, Northfield, IL (US)

(72) Inventors: F. Leo Hickey, Arlington Heights, IL (US); Timothy Lambert, Lindenhurst, IL (US); Chunhua Yao, Wheeling, IL (US)

(73) Assignee: Stepan Company, Northfield, IL (US)

( * ) Notice: Subject to any disclaimer, the term of this patent is extended or adjusted under 35 U.S.C. 154(b) by 259 days.

(21) Appl. No.: 13/692,507

(22) Filed: Dec. 3, 2012

(65) Prior Publication Data

US 2013/0090399 A1  Apr. 11, 2013

Related U.S. Application Data

(60) Division of application No. 12/748,047, filed on Mar. 26, 2010, now abandoned, which is a continuation of application No. PCT/US2008/077993, filed on Sep. 26, 2008.

(60) Provisional application No. 61/085,342, filed on Jul. 31, 2008, provisional application No. 60/976,182, filed on Sep. 28, 2007.

(51) Int. Cl.
| | |
|---|---|
| C08G 18/06 | (2006.01) |
| C08G 18/36 | (2006.01) |
| C08G 18/42 | (2006.01) |
| C08G 18/66 | (2006.01) |
| C08G 63/20 | (2006.01) |
| C08G 63/668 | (2006.01) |
| C08G 63/91 | (2006.01) |
| C08J 9/14 | (2006.01) |
| C08G 101/00 | (2006.01) |

(52) U.S. Cl.
CPC ............... *C08G 18/06* (2013.01); *C08G 18/36* (2013.01); *C08G 18/4288* (2013.01); *C08G 18/6662* (2013.01); *C08G 63/20* (2013.01); *C08G 63/668* (2013.01); *C08G 63/916* (2013.01); *C08J 9/141* (2013.01); *C08G 2101/005* (2013.01); *C08G 2101/0025* (2013.01); *C08G 2105/02* (2013.01); *C08J 2375/06* (2013.01)

(58) Field of Classification Search
CPC .... C08G 18/06; C08G 18/36; C08G 18/4288; C08G 18/6662; C08G 2101/0025; C08G 2101/005; C08G 2105/02; C08G 63/20; C08G 63/668; C08G 63/916; C08J 2375/06; C08J 9/141

See application file for complete search history.

(56) References Cited

U.S. PATENT DOCUMENTS

| | | | |
|---|---|---|---|
| 4,508,853 A * | 4/1985 | Kluth | C08G 18/36 252/182.2 |
| 4,529,744 A | 7/1985 | Wood | |
| 5,660,926 A * | 8/1997 | Skowronski et al. | 428/314.4 |
| 5,922,779 A * | 7/1999 | Hickey | 521/114 |
| 6,107,433 A | 8/2000 | Petrovic et al. | |
| 6,359,022 B1 * | 3/2002 | Hickey et al. | 521/114 |
| 6,359,023 B1 * | 3/2002 | Kluth | C08G 18/10 521/107 |
| 6,443,121 B1 | 9/2002 | Carroll et al. | |
| 6,573,354 B1 | 6/2003 | Petrovic et al. | |
| 6,686,435 B1 | 2/2004 | Petrovic et al. | |
| 2004/0192859 A1 | 9/2004 | Parker et al. | |
| 2006/0264524 A1 * | 11/2006 | Abraham et al. | 521/172 |
| 2008/0076901 A1 * | 3/2008 | Garrett et al. | 528/44 |
| 2009/0082483 A1 * | 3/2009 | Petrovic | C07C 69/21 521/172 |
| 2015/0051304 A1 * | 2/2015 | Shieh | C08J 9/143 521/98 |

FOREIGN PATENT DOCUMENTS

| | | |
|---|---|---|
| CA | 1293584 | 12/1991 |
| EP | 0256355 | 2/1988 |
| WO | 01/04225 | 1/2001 |
| WO | 2005/085310 | 9/2005 |

OTHER PUBLICATIONS

Prociak A., "Properties of Polyurethane Foams Modified with Natural Oil-Based Polyols," Cellular Polymers, Rapra Technology Ltd., Shawbury, Shrewsbury, GB, vol. 26, No. 6, Jan. 2007, pp. 381-392, XP001510444, ISSN: 0262-4893.
Supplementary European Search Report for European Application No. 08836595 dated Mar. 3, 2015.
International Preliminary Report on Patentability in PCT/US2008/077993, dated Apr. 4, 2010.
International Search Report in PCT/US08/77993, dated Jan. 29, 2009.

* cited by examiner

*Primary Examiner* — John Cooney
(74) *Attorney, Agent, or Firm* — McAndrews, Held & Malloy, Ltd.

(57) ABSTRACT

There are provided aromatic polyester polyol compositions comprising: (i) at least one aromatic acid component; (ii) at least one hydroxylated component; (iii) at least one functionalized natural oil component; and (iv) optionally at least one catalyst component for use in preparing foams. The aromatic polyester polyol compositions can be formed by esterification and/or transesterification. The present technology also provides a polyol blend for use in preparing foams wherein the polyol blend comprises (a) an aromatic polyester polyol formed by an interesterification reaction between (i) a phthalic acid based material; (ii) a hydroxylated material; and (iii) a hydrophobic material, wherein the hydrophobic material is present in an amount of from about 1% to about 50% by weight of the aromatic polyester polyol; and (b) a natural oil based polyol, wherein the hydrophobic material in the aromatic polyester polyol compatibilizes the natural oil based polyol to form a phase stable polyol blend.

18 Claims, 11 Drawing Sheets

AROMATIC POLYESTER POLYOLS AND AROMATIC POLYESTER POLYOL BLENDS CONTAINING BIORENEWABLE COMPONENTS AND METHODS OF MAKING

RELATED APPLICATIONS

This application is a divisional of U.S. application Ser. No. 12/748,047, filed Mar. 26, 2010, which application is a continuation of International application Serial No. PCT/US2008/077993 (International Publication No. WO/2009/045926), having an International filing date of Sep. 26, 2008. This PCT application claims priority to U.S. Provisional Application No. 60/976,182 filed on Sep. 28, 2007 and U.S. Provisional Application No. 61/085,342 filed on Jul. 31, 2008. The entire specifications of the PCT, provisional and non-provisional applications referred to above are hereby incorporated by reference.

BACKGROUND OF THE INVENTION

The use of biorenewable components as substitutes, either in whole or in part, for petrochemical derived raw materials is an emerging trend in the chemical industry. At least one benefit includes the use of a raw material that is non-depleting of fossil resources (i.e. renewable), and in some cases a reduction in lifecycle global warming potential due to the fixation of $CO_2$ in plant biomass from which the biorenewable materials are derived.

Biorenewable raw materials are typically either carbohydrate based or natural oil based. Prior to their end-use as polyols, the biorenewable raw materials may or may not undergo further chemical transformation, with or without other petrochemical based materials.

There are challenges to the use of natural oils as raw materials for polyols to be used in isocyanate based foam products (e.g. polyurethanes and polyisocyanurates). The natural oils, with the exception of those oils having hydroxyl functionality (e.g. castor oil, or lesquerella oil), typically lack isocyanate reactive functionality, and must undergo chemical transformation, such as, for example, transesterification with functionalized materials, epoxidation and ring opening, oxidation, ozonolysis, or hydroformylation to add reactive functionality. The added reactive functionality could be any active hydrogen moiety, and is typically hydroxyl groups or amines.

The properties (e.g. compressive strength, green strength, reactivity, thermal stability) of resultant foams formed from the reaction of functionalized natural oils with isocyanate are typically deteriorated relative to foams made solely from petrochemical polyols. This deterioration of foam properties can be due, at least in part, to the plasticization of the foam by the relatively high aliphatic concentration of the natural oils. The deterioration of foam properties can also be due, at least in part, to the poor reactivity of the functional group due to steric hindrance by the aliphatic chains of the oil, and the incompatibility of the natural oil polyol with the isocyanate.

Also, when natural oils are used in combination with petrochemical polyols, the natural oil is frequently not compatible with the petrochemical polyol, which again results in the deterioration of foam properties. This is often the case with aromatic polyester polyols, and compatibility becomes an important issue, both for the polyol producer desiring to market an aromatic polyester polyol containing natural oil-derived renewable content, and for the end user. The polyol producer requires a product which is phase stable during storage and shipping, and does not separate into its component parts. The end user may also store the polyol before use, and in addition must be able to blend the polyol with other formulation ingredients and use it before its separation into component parts.

There is a need for aromatic polyester polyol compositions containing renewable components such as natural oils, which can be used to make polyisocyanurate foams, such as pentane blown foams, having good foam strength, flammability resistance and insulation characteristics. Desirably, these polyol compositions should be phase-stable; and in foam formulations should preferably maintain pentane compatibility, have a good reactivity profile, mix well with isocyanate, and minimally deteriorate the physical and thermal properties of the resultant foams.

BRIEF SUMMARY OF THE INVENTION

In one aspect of the present technology, several advantages and benefits are obtained when an aromatic acid based material (e.g., phthalic acid based material) that has been interesterified with a hydroxylated material and a hydrophobic material is blended with one or more natural oil based polyols to make an aromatic polyester polyol/natural oil based polyol blend. Normally aromatic polyester polyols and natural oil based polyols are incompatible and separate into two separate phases after mixing. However, phase stable and compatible blends of aromatic polyester polyols and natural oil based polyols can be obtained by (1) inter- or transesterifying the aromatic polyester polyol with a hydrophobic material before blending the aromatic polyester polyol and the natural oil based polyol; (2) by adding a nonionic surfactant in order to compatibilize the natural oil based polyol with the aromatic polyester polyol to form the phase stable blend; (3) by utilizing both the aromatic polyester polyol transesterified with the hydrophobic material and the nonionic surfactant, or (4) by transesterifying the aromatic polyester polyol with a functionalized natural oil.

Another aspect of the present technology relates to phase stable blends of aromatic polyester polyols and natural oil based polyols. In one aspect, the aromatic polyester polyol comprises the interesterification of (a) an aromatic acid based material, (b) a hydroxylated material, and (c) a hydrophobic material. In another embodiment, the aromatic polyester polyol is a phthalate polyester polyol comprising the reaction products of (a) phthalate acid based materials, (b) low molecular weight aliphatic diol compounds, and (c) certain hydrophobic materials. Suitable hydrophobic materials include, for example, carboxylic acids (especially fatty acids), lower alkanol esters of carboxylic acids (especially fatty acid methyl esters, fatty acid alkanolamides, natural oils, and triglycerides (especially fats and oils) derived from renewable resources. The reacting of the hydrophobic material, e.g., natural oil with the aromatic polyester polyol compatibilizes the aromatic polyester polyol so that it can be further blended with a natural oil polyol. The aromatic polyester polyol blended with the natural oil polyol provides phase stable aromatic polyol blends.

In some aspects, the natural oil polyol comprises natural oil based polyols that comprise hydroxyl-containing natural oils, preferably triglyceride oils that have been epoxidized and then reacted with one or more diols to form polyols having primary hydroxyl groups, or natural oils that have been transamidated with, for example, diethanolamine. The aromatic polyester polyol contains from about 1% to about 50% by weight, based on the total weight of the polyester polyol, of the hydrophobic material, more preferably about 5% to about 50% by weight. In one embodiment, the blend of aromatic polyester polyol/natural oil based polyol comprises from about 30 to about 95% by weight aromatic polyester polyol and from about 5% to about 70% by weight natural oil based polyol.

In an alternative aspect, the blend of polyols further comprises a nonionic surfactant. The nonionic surfactant acts as an additional compatibilizer for the natural oil based polyols resulting in blends of aromatic polyester polyols and natural oil based polyols that are phase stable.

In a further aspect of the present technology, a nonionic surfactant is used as the only compatibilizer for the natural oil based polyol. In this embodiment, the aromatic polyester polyols comprise the reaction product of aromatic acid based materials (e.g., phthalic acid based material) and a hydroxylated material (e.g., low molecular weight aliphatic diol compounds) without esterifying or transesterifying a hydrophobic material into the aromatic acid based polyol.

In another aspect, the present technology provides polyisocyanate-based foams formed by the reaction of a polyisocyanate with a polyol resin blend comprising:
 (a) an aromatic polyester polyol formed by an interesterification reaction between
  (i) a phthalic acid based material;
  (ii) a hydroxylated material, and
  (iii) a hydrophobic material;
 (b) a natural oil based polyol; and
 (c) a blowing agent.
The natural oil based polyol may comprise a functionalized natural oil, a non-functionalized natural oil or a combination thereof.

A further aspect of the present technology relates to aromatic polyester polyol compositions comprising (i) at least one aromatic acid component; (ii) at least one hydroxylated component; (iii) at least one functionalized natural oil component; and (iv) optionally at least one catalyst component. The aromatic polyester polyol can be formed by esterification and/or transesterification. Further, the aromatic polyester polyol can further comprise a non-functionalized natural oil component.

There is also provided a process for producing an aromatic polyester polyol composition comprising the steps of: (i) providing at least one aromatic acid component; at least one hydroxylated component; at least one functionalized natural oil component; and optionally at least one catalyst component to form a reaction mixture; and (ii) esterifying and/or transesterifying the reaction mixture to form an aromatic polyester polyol composition. The method may further include in step (i) providing a non-functionalized oil component.

The aromatic polyester polyol composition can also be formed by first reacting the functionalized natural oil component with the hydroxylated component to form a reaction mixture; and then transesterifying or esterifying the reaction mixture with the aromatic acid component to form the aromatic polyester polyol.

In some embodiments, the aromatic polyester polyol formed can be blended with a natural oil polyol to provide an aromatic polyester polyol blend.

In another aspect, the present technology provides a foam forming composition comprising at least one diisocyanate component and/or at least one polyisocyanate component; and at least one aromatic polyester polyol component comprising: (i) at least one aromatic acid component; (ii) at least one hydroxylated component; (iii) at least one functionalized natural oil component; and (iv) optionally at least one catalyst component. Further, the foam composition may comprise (v) a nonfunctionalized natural oil component.

There is also provided a polyisocyanurate foam formed by the reaction of a polyisocyanate composition with an aromatic polyester polyol composition comprising: (i) at least one aromatic acid component; (ii) at least one hydroxylated component; (iii) at least one functionalized natural oil component; and (iv) optionally at least one catalyst component. In another embodiment, the aromatic polymer polyol further comprises (v) at least one non-functionalized oil component.

In certain aspects of the present technology, the foam is a rigid foam, a closed cell rigid polyurethane foam, or a urethane-modified polyisocyanurate foam.

In other aspects, the use of transesterified natural oils (NO) or modified natural oils, which include, for example, functionalized natural oils, in aromatic polyester polyols, instead of blending natural oils with aromatic polyester polyols, yields significant property improvements in the resulting rigid foams made from the transesterified or modified natural oils.

In some aspects of the present technology, the use of functionalized oils improves foam properties compared to the use of non-functional oils alone in foams prepared from aromatic polyester polyols, when either oil is transesterified into the aromatic polyester polyol.

In some aspects, the use of a nonionic surfactant in aromatic polyester polyols containing natural oils increases reactivity of the foam forming composition, thereby allowing a reduction in the level of foaming catalyst, compared against foams prepared with natural oil containing aromatic polyester polyols and no nonionic surfactant.

In another aspect, it has also been found that pentane compatibility is improved in aromatic polyester polyols that contain natural oils by incorporating a mixture of a transesterified non-functional oil (e.g. soybean oil) and a transesterified functional oil (e.g. castor oil or reacted epoxidized soybean oil), when compared against a polyol that contains only transesterified functionalized oil as the natural oil component.

In a further aspect, it has also been found that the long term thermal resistance (e.g.—k factor or R value) of foams prepared with transesterified natural oils is improved by using functionalized oils compared to foams prepared using a non-functionalized oil.

In some aspects, the present technology provides an aromatic polyester polyol comprising the interesterification of an aromatic acid material, a hydroxylated material, and an hydrophobic material, wherein the aromatic polyester polyol is transesterified with the functionalized natural oil and blended with a nonionic surfactant.

Nonionic surfactant addition to transesterified aromatic/functionalized natural oil polyols, with or without reacted natural oil, increases reactivity at equal catalyst levels, or reduces catalyst requirements at equal reactivity. In some aspects, the present technology provides resin blends comprising an aromatic polyester polyol or polyol blends of the present technology, a foam catalyst, a cell stabilizing surfactant, and at least one blowing agent. Additionally, the resin blends may further comprise flame retardants, colorants, additional nonionic surfactants, etc.

In some aspects, the present technology comprises a polyol blend comprising an aromatic polyester polyol formed by an interesterification reaction between a phthalic acid based material; a hydroxylated material; and a hydrophobic material, wherein the hydrophobic material is present in an amount of from about 1% to about 50% by weight of the aromatic polyester polyol; and a natural oil based polyol wherein the hydrophobic material in the aromatic polyester polyol compatibilizes the natural oil based polyol to form a phase stable polyol blend. The hydrophobic material is selected from the group consisting of carboxylic acids, lower alkanolesters of carboxylic acids, fatty acid alkanolamides, triglycerides, alkyl alcohols, and mixtures thereof. The natural oil based polyol in the blend is a triglyceride oil based polyol, wherein the triglyceride oil is derived from castor oil, coconut oil, corn oil, cottonseed oil, linseed oil, olive oil, palm oil, palm kernel oil, peanut oil, soybean oil, sunflower oil, tall oil, tallow and mixtures thereof. Alternatively, the natural oil based polyol is a functionalized natural oil, or a combination of a functionalized natural oil and nonfunctionalized natural oil. In some embodiments the polyol blend comprises from about 5% to about 70% by weight natural oil based polyol, alternatively from about 5% to about 50% by weight natural oil based polyol. The polyol blend can further comprise a nonionic surfactant, which can be present in the polyol blend in an amount of about 1% to about 30% by weight of the blend, alternatively about 1% to about 15% by weight of the blend. In some embodiments, the polyol blend is clear.

In another aspect, the present technology comprises a polyol blend comprising an aromatic polyester polyol comprising a phthalic acid based material and a hydroxylated material; a natural oil based polyol, and from about 1% to about 30% by weight, alternatively from about 1% to about 15%, by weight of the blend of a nonionic surfactant, wherein the nonionic surfactant compatibilizes the natural oil based polyol to form a phase stable polyol blend. The natural oil based polyol comprises from about 5% to about 50% by weight of the blend, alternatively, from about 5% to about 70% by weight of the blend. The natural oil based polyol can be a triglyceride oil based polyol. In some aspects, the triglyceride oil based polyol is derived from a triglyceride oil, selected from the group consisting of castor oil, corn oil, cottonseed oil, linseed oil, olive oil, palm oil, palm kernel oil, peanut oil, soybean oil, sunflower oil, tallow and mixtures thereof. The nonionic surfactant comprises a polyoxyalkylene surfactant having from about 4 to about 240 oxyalkylene groups per molecule. In some aspects, the nonionic surfactant has a hydrophobic portion derived from at least one starting compound selected from the group consisting of fatty alcohols containing from about 6 to about 18 carbon atoms each, fatty amides containing from about 6 to about 18 carbon atoms each in the fatty acid moiety, fatty amines containing from about 6 to about 18 carbon atoms each, fatty acids containing from about 6 to about 18 carbon atoms each, phenols and/or alkyl phenols wherein the alkyl group contains from about 4 to about 16 carbon atoms each, fats and oils containing from about 6 to about 20 carbon atoms each, polyoxypropylene glycols containing from about 10 to about 70 moles of propylene oxide, polyoxybutylene glycols containing from 10 to 70 moles of butylene oxide, and mixtures thereof. In one embodiment of the polyol blend, the phthalic acid based material is phthalic anhydride, the hydroxylated material is diethylene glycol, and the hydrophobic material is soybean oil.

In some aspects, the present technology comprises a polyol blend comprising an aromatic polyester polyol formed by an interesterification reaction between (i) a phthalic acid based material; (ii) a hydroxylated material; and (iii) a hydrophobic material.

In another aspect, the present technology comprises a polyisocyanate-based foam comprising the reaction product of a polyisocyanate and a resin blend comprising (i) an aromatic polyester polyol formed by an interesterification reaction between a phthalic acid based material; a hydroxylated material; and a hydrophobic material; (ii) a natural oil based polyol; and (iii) a blowing agent. In some embodiment, the resin blend used in the polyisocyanate-based foam further comprises a nonionic surfactant. The natural oil based polyol in the resin blend is a triglyceride based polyol.

DETAILED DESCRIPTION OF THE INVENTION

Figure 1:
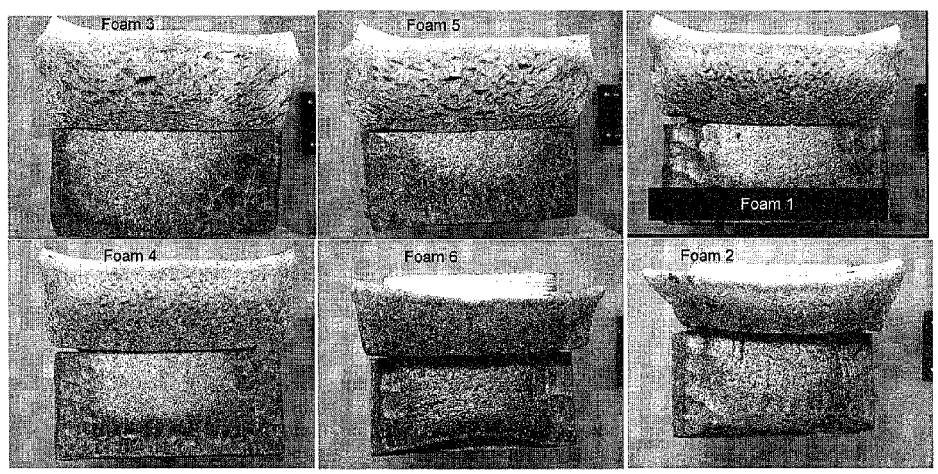
FIG. 1 shows the hotplate performance (thermal stability) results of rigid foams made using natural oil containing polyols that were prepared by transesterification of the natural oil into the polyester. Comparison is shown against foams made using polyols made by blending natural oils into an aromatic polyester polyol containing no oil.

The present technology provides new approaches to blending of natural oil polyols into aromatic polyester polyols as a means to introduce renewable content into polyols used for polyurethane and polyisocyanate resins and foams. This approach includes transesterifying natural oil based components into the aromatic polyester polyol.

The present technology relates to aromatic polyester polyols containing renewable natural oil components, the phase stable blends of aromatic polyester polyols and natural oil polyols, and combinations thereof which can be used to make polyurethane and polyisocyanurate foams, such as pentane blown foams, with good foam strength, flammability resistance and insulation characteristics. These polyol blends contain the renewable natural oil polyols, and when used in foam formulations, maintain pentane compatibility, have good reactivity profiles, and mix well with isocyanate. Further, the present technology provides aromatic polyester polyols that contain reacted functionalized natural oil components which can be used directly in producing polyurethane and polyisocyanurate foams. It also provides aromatic polyester polyols which can be blended with natural oil polyols to form the aromatic polyester polyol/natural oil blends.

One embodiment of the present technology provides a phase stable polyol blend comprising an aromatic acid based polyester polyol and a natural oil polyol. The aromatic acid based polyester polyol is formed by interesterification or transesterification reaction between (a) an aromatic acid based material (e.g., a phthalic acid based material), (b) an hydroxylated material and a (c) hydrophobic material. The aromatic acid based polyester polyol is blended with the natural oil component polyol, wherein the hydrophobic material in the aromatic polyester polyol compatibilizes the natural oil based polyol.

The term "polyester polyol" as used herein means a polyol having ester linkages. The polyester polyols advantageously have an average functionality of from about 1.5 to 8.0, preferably from about 1.6 to 6.0, and more preferably from about 1.8 to 4.0. Their average hydroxyl number values generally fall within a range of about 100 to 600, preferably about 100 to 400, alternatively about 150 to about 400, alternatively about 150 to 350, alternatively about 180 to about 250 (taking into account the free glycols that may be present), and their free glycol content generally is from about 1 to 30 weight percent, and usually from 2 to 20 weight percent, of the total polyester polyol. The viscosity of the aromatic polyester polyol ranges from about 300 to about 25,000 centipoise at a temperature of about 25° C.

The aromatic acid component of the aromatic polyester polyol composition can be, for example, phthalic acid based material, phthalic acid, terephthalic acid, isophthalic acid, phthalic anhydride, pyromellitic anhydride, dimethyl terephthalate, polyethylene terephthalate, trimellitic anhydride, bottom residues, derivatives thereof, and combinations thereof. By phthalic acid based material as used herein is meant phthalic acid or a derivative of phthalic acid. Examples of phthalic acid based materials include, e.g., various phthalic acids such as terephthalic acid and isophthalic acid, phthalic anhydride, dimethyl terephthalate, polyethylene terephthalate, trimellitic anhydride, derivatives thereof, and combinations thereof. The phthalic acid based materials for use in preparing the polyester polyols can be (a) substantially pure phthalic acid or phthalic acid derivatives, such as phthalic anhydride, terephthalic acid, dimethyl terephthalate, isophthalic acid, and trimellitic anhydride; or (b) somewhat complex mixtures such as side stream, waste or scrap products containing residues of phthalic acid. In this context, "residues of phthalic acid" means any reacted or unreacted phthalic acid remaining in a product after its manufacture by a process in which phthalic acid or a derivative thereof is a starting component, including bottom residues. Complex mixtures of phthalic acid residues are further described in U.S. Pat. No. 5,922,779, which is herein incorporated by reference in its entirety.

A preferred phthalic acid based material for use in the preparation of the aromatic polyester polyols is phthalic anhydride. This component can be replaced by phthalic acid or a phthalic anhydride bottoms composition, a phthalic anhydride crude composition, or a phthalic anhydride light ends composition, as such compositions are defined in U.S. Pat. No. 4,529,744.

The aromatic acid component of the aromatic polyester polyol composition can comprise, for example, from about 20% to about 50% by weight of the aromatic polyester polyol composition, alternatively between about 20% to about 40% by weight.

The hydroxylated component of the aromatic polyester polyol composition of the present technology can be, for example, at least one aliphatic diol, at least one derivative thereof, or combinations thereof.

The hydroxylated component may be an aliphatic diol of generic formula (1):

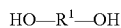

HO—R$^1$—OH where R$^1$ is a divalent radical selected from the group consisting of
(a) alkylene radicals each containing from 2 through 6 carbon atoms, and
(b) radicals of the formula (2):

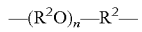

—(R$^2$O)$_n$—R$^2$— where R$^2$ is an alkylene radical containing from 2 through 3 carbon atoms, and n is an integer of from 1 through 3, and
(c) mixtures thereof.

Examples of suitable aliphatic diols of formula (1) include ethylene glycol, propylene glycol, diethylene glycol, dipropylene glycol, trimethylene glycol, butylene glycols, 1,2-cyclohexanediol, poly (oxyalkylene) polyols each containing from two to four alkylene radicals derived by the condensation of ethylene oxide, propylene oxide, or any combination thereof, and the like. As those skilled in the art will appreciate, in the preparation of mixed poly(oxyethylene-oxypropylene) polyols, the ethylene and propylene oxides may be added to a starting hydroxyl-containing reactant either in admixture or sequentially. Mixtures of such diols can be employed, if desired. A presently most preferred aliphatic diol of formula (I) is diethylene glycol. Additionally, amine-based aliphatic hydroxylated materials (i.e., hydroxylated amines) may be utilized, such as for example, monoethanolamine, diethanolamine, and triethanolamine.

Optionally, and for example, mixtures of diols can incorporate low molecular weight polyols (that is, compounds which contain less than 7 carbon atoms per molecule but which contain at least three hydroxyl groups per molecule) in an amount generally ranging from greater than 0 up to 100 percent of the total hydroxylated material. Such polyols comprise, for example, glycerol, 1,1,1-trimethylolpropane, 1,1,1-trimethylolethane, 2,2-dimethyl-1,3-propane diol, pentaerythritol, mixtures thereof, and the like.

The hydroxylated component of the aromatic polyester polyol composition can be, for example, diethylene glycol, glycerol, trimethylolpropane, pentaerythritol, ethylene glycol, propylene glycol, dipropylene glycol, trimethylene glycol, butylene glycols, 1,2-cyclohexanediol, hexane diols, pentane diols, poly oxyalkylene diols (e.g.—tri and tetra ethylene glycol), derivatives thereof, and combinations thereof.

The hydroxylated component of the aromatic polyester polyol composition can comprise, for example, from about 30% to about 80% based on the total weight of the aromatic polyester polyol composition. Alternatively, the hydroxylated component of the aromatic polyester polyol can be from about 30-65% by weight, based on the total weight of the polyester polyol. Alternatively, the hydroxylated material in the polyester polyol is from about 40-60% by weight, based on the total weight of the aromatic polyester polyol.

The hydrophobic material of the present technology includes, for example, carboxylic acids (especially fatty acids), lower alkanol esters of carboxylic acids (especially fatty acid methyl esters) fatty acid alkanolamides, and natural oils (e.g., triglycerides (especially fats and oils)) derived from renewable resources. The natural oils may be unmodified (e.g., do not contain a hydroxyl functional group), functionalized (natural oil polyols) or a combination thereof. Suitable natural oils for practice of the present technology include, for example, triglyceride oils, coconut oil, cochin oil, corn oil, cottonseed oil, linseed oil, olive oil, palm oil, palm kernel oil, peanut oil, soybean oil, sunflower oil, tall oils, tallow, lesquerella oil, tung oil, whale oil, tea seed oil, sesame seed oil, safflower oil, rapeseed oil, fish oils, derivatives thereof, and combinations thereof. Suitable derivatives thereof of natural oils include, but are not limited to, carboxylic acids (e.g., fatty acids, lower alkanol esters (e.g., fatty acid methyl esters) and fatty acid alkanolamides. Examples of fatty acids include, but are not limited to, caproic, caprylic, capric, lauric, myristic, palmitic, stearic, oleic, linoleic, linolenic, ricinoleic, and mixtures thereof. Another suitable acid is 2-ethylhexanoic acid. Examples of fatty acid methyl esters include, but are not limited to, methyl caproate, methyl caprylate, methyl caprate, methyl laurate, methyl myristate, methyl palmitate, methyl oleate, methyl stearate, methyl linoleate, methyl linolenate, and mixtures thereof. Examples of fatty alkanolamides include, but are not limited to, tall oil fatty acid diethanolamide, lauric acid diethanolamide, and oleic acid monoethanolamide. These suitable natural oils can be functionalized by expoxidizing and/or hydroxylating reactions.

In some embodiments of the aromatic polyester polyol blend, the hydrophobic material is about 1% to about 50% of the total weight of the aromatic polyester polyol, alternatively about 5% to about 50%. Suitably, the hydrophobic material is a natural oil component.

The aromatic acid based polyester polyol reaction product is formed by the interesterification of a ternary system comprising the aromatic acid based material (e.g., phthalic acid), the hydroxylated material, and the hydrophobic material. The term interesterification as used herein means that the aromatic acid based material is esterified and/or transesterified by the hydroxylated material and/or the hydrophobic material, and the hydroxylated material is additionally esterified and/or transesterified by the hydrophobic material, to produce an interesterification product. The interesterification product contains one or more aromatic acid moieties randomly interspersed between the hydroxylated material and/or the hydrophobic material. The interesterification reaction typically occurs at a temperature of about 180° C. to about 220° C., although other temperatures can satisfactorily enable the desired interesterification reaction. Further details and examples of the preparation of the aromatic acid (e.g., phthalic) based polyester polyol reaction product are described in U.S. Pat. Nos. 6,359,022 and 5,922,779, incorporated herein by reference.

In some embodiments of the present technology, several advantages and benefits are obtained when an aromatic acid based material that has been interesterified with a hydroxylated material and a hydrophobic material is blended with one or more natural oil based polyols to make an aromatic polyester polyol/natural oil based polyol blend. Phase stable and compatible blends of aromatic polyester polyols and natural oil based polyols can be obtained by inter- or transesterifying the aromatic polyester polyol with a hydrophobic material before blending the aromatic polyester polyol and the natural oil based polyol; by adding a nonionic surfactant in order to compatibilize the natural oil based polyol with the aromatic polyester polyol to form the phase stable blend; or by utilizing both the aromatic polyester polyol transesterified with the hydrophobic material and the nonionic surfactant.

The aromatic acid based polyester polyol can be transesterified with a functionalized natural oil polyol to form the phase stable blend. In some embodiments, the aromatic acid based polyester polyol is reacted with one or more natural oil based polyols, for example, non-functionalized natural oils, functionalized natural oils or a combination thereof, to make the polyol blends of the present technology. For example, in some embodiments, the natural oil component polyol is a triglyceride oil polyol comprising hydroxyl-containing triglyceride oils, preferably triglyceride oils that have been epoxidized and then reacted with one or more diols to form polyols having primary hydroxyl groups, or triglyceride oils that have been transamidated with, for example, diethanolamine.

In some embodiments, the suitable functionalized natural oil component of the aromatic polyester polyol composition of the present invention can be, for example, castor oil, functionalized castor oil, functionalized coconut oil, functionalized cochin oil, functionalized corn oil, functionalized cottonseed oil, functionalized linseed oil, functionalized olive oil, functionalized palm oil, functionalized palm kernel oil, functionalized peanut oil, functionalized soybean oil, functionalized sunflower oil, functionalized tall oils, functionalized tallow, functionalized lesquerella oil, functionalized tung oil, functionalized whale oil, functionalized tea seed oil, functionalized sesame seed oil, functionalized safflower oil, functionalized rapeseed oil, functionalized fish oils, derivatives thereof, and combinations thereof.

In some embodiments, the natural oil polyol is a functionalized natural oil that can be prepared by epoxidizing the natural oil and subsequently reacting the epoxidized oil with water and/or a hydroxylated material to convert the epoxy groups to OH groups. Epoxidized natural oils are commercially available, or alternatively can be prepared by reacting unsaturated natural oils with a peroxyacid to form the epoxidized oil. Various methods are described in the art for preparing epoxidized oils, including for example the methods described in U.S. Pat. Nos. 6,107,433; 6,433,121; 6,573,354; and 6,686,435. Suitable materials for use in converting the epoxy groups to OH groups include any reactive hydrogen compounds such as hydrogen, water, lithium aluminum hydride, sodium borohydride, ammonia, or aliphatic or aromatic amines; aliphatic or aromatic alcohols and their alkoxides (mono functional), glycols, triols, tetraols, sugars etc.; carboxylic acids; mineral acids, including, for example, hydrochloric, sulfuric, and phosphoric acids. An amount of hydroxylated material is reacted with the epoxidized triglyceride oil sufficient to convert from about 10% to about 100% of the epoxy groups to hydroxy groups.

The hydroxylation of the epoxidized natural oil can take place at temperatures ranging from about 50° C. to about 250° C. and at pressures ranging from 0 to about 4000 psi. The resulting natural oil based polyol has an OH value ranging from about 25 to about 500 mg/KOH/g and an acid value of from 0 to about 10 mg/KOH/g.

In an alternative embodiment, the natural oil can be transamidated with an amine such as, for example, aliphatic or aromatic amines, alkanolamines, and ammonia. Suitable amines for use herein include ammonia, aniline, methyl amine, ethylamine, diethylamine, methyl ethanolamine, tallowamine, ethanolamine, diethanol amine, ethylene diamine, diethylene triamine, and mixtures thereof. One or more amines are reacted with the natural oil in an amount of about 10 to about 100 equivalent % based on the number of acyl groups present in the natural oil.

The aromatic acid based polyester polyols (e.g., phthalic acid based polyester polyols) can be cold blended with the natural oil based polyols to form phase stable blends of polyols. By "phase stable" is meant that the blend polyols form a single phase that does not separate into two or more separate phases within a 24 hour period. The phase stable blends can be clear, indicating that the blends are completely miscible, or can be cloudy but still phase stable. The ratio of aromatic acid-based polyester polyol to natural oil based polyol can vary depending in part upon the amount of hydrophobic material interesterified into the aromatic acid based polyol and also depending in part upon the selected natural oil based polyol. For example, if castor oil is selected as the natural oil based polyol, then an amount of hydrophobic material of up to about 50% by weight may be required to be transesterified into the aromatic acid based polyester polyol in order to achieve a phase stable blend of 25% castor oil and 75% aromatic acid based polyester polyol.

In general, the amount of aromatic acid based polyester polyol in the blend ranges from about 30% to about 95% by weight of the blend, and the amount of natural oil based polyol ranges from about 5% to about 70% by weight of the blend. Preferably, the amount of natural oil based polyol ranges from about 10% to about 50% by weight of the blend.

In an alternative embodiment of the present technology, a nonionic surfactant can be used either alone or in combination with the aromatic acid based polyester polyols described herein to compatibilize the natural oil based polyols. By "used alone" is meant that the nonionic surfactant is used with a conventional aromatic acid based polyol (e.g., phthalic acid based polyol), such as a phthalic anhydride-diethylene glycol polyol (PA-DEG), which has not been transesterified with a hydrophobic material, and therefore the nonionic surfactant acts as the only compatibilizer for the natural oil based polyol. However, better compatibilization of the natural oil based polyol is achieved with a combination of the nonionic surfactant and the aromatic acid based polyester polyols containing transesterified hydrophobic material. In some embodiments, the aromatic polyol blend further comprises a nonionic surfactant, wherein the nonionic surfactant and the hydrophobic material compatibilize the natural oil based polyol to form a phase stable polyol blend.

Nonionic surfactants are those compounds that contain one or more hydrophobic moieties and one or more hydrophilic moieties and which have no moieties that dissociate in aqueous solution or dispersion into cations and anions.

The nonionic surfactant added to the aromatic polyester composition can be, for example, a polyoxyalkylene nonionic surfactant. While nearly any nonionic surfactant compound can be employed, in general, in the practice of the present technology, it is preferred that the nonionic surfactant be a polyoxyalkylene surfactant which contains an average of from about 4 to about 240 individual oxyalkylene groups per molecule with the oxyalkylene groups typically being selected from the group consisting of oxyethylene and oxypropylene. Polyoxyalkylene nonionic surfactants may be based on any starting material which bears groups with hydrogen atoms reactive to alkoxylation. This includes hydroxyl, carboxyl, thiol, and primary and secondary amine groups.

The surfactants may be based on materials with three or more alkoxylation-active functional groups, as well as the more commonly used mono- and di-functional starting materials. Thus, the product formed from glycerol, reacted with propylene oxide to form three discrete polyoxypropylene blocks, followed by reaction with ethylene oxide to add one polyoxyethylene block to each polyoxypropylene block, is a nonionic surfactant (in certain circumstances this nonionic surfactant may also function as a polyol), so long as it has polyoxypropylene blocks of sufficient size to function as the hydrophobic portion of the molecule. The fact that block polymers with more than two polyoxyalkylene chains can function as surfactants is illustrated by the Tetronic series of commercial surfactant products, described in Polyethers, Part I: Polyalkylene Oxides and Other Polyethers, N. G. Gaylord, ed., Interscience, 1963, pp. 233-7. Useful Tetronic surfactants generally have four polyoxyalkylene chains and exhibit the surface activity typical of materials used as surfactants. It is also notable that propoxylation to an average level of only two propylene oxide units per chain, followed by ethoxylation, is sufficient to create a material which functions as a nonionic surfactant.

The hydrophobic portion of a nonionic surfactant is preferably derived from at least one starting compound which is selected from the group consisting of:
(a) fatty alcohols containing from about 6 to 18 carbon atoms each,
(b) fatty amides containing from about 6 to 18 carbon atoms each in the fatty acid moiety,
(c) fatty amines containing from about 6 to 18 carbon atoms each,
(d) fatty acids containing from 6 to 18 carbon atoms each,
(e) phenols and/or alkyl phenols wherein the alkyl group contains from about 4 to 16 carbon atoms each,
(f) fats and oils containing from 6 to about 60 carbon atoms each,
(g) polyoxypropylene glycols containing from 10 to 70 moles of propylene oxide,
(h) polyoxybutylene glycols containing from 10 to 70 moles of butylene oxide, and
(i) mixtures thereof.

In making a nonionic surfactant, such a starting compound is sufficiently alkoxylated to provide a desired hydrophilic portion. Depending on the alkoxylation reactant proportions used, the starting compound is alkoxylated on average with about 3 to 125 moles of alkylene oxide per mole of starting compound, where the alkoxylation material is preferably selected from the group consisting of ethylene oxide, propylene oxide, and mixtures thereof. Examples of nonionic surfactants contemplated as compatibilizers for the triglyceride oil based polyol include, but are not limited to, the reaction product of one mole of Neodol® 45 (a linear $C_{14}$-$C_{15}$ alcohol available from Shell Chemical Co.), 14 moles of propylene oxide (PO), and 11 moles of ethylene oxide (EO); the reaction product of one mole of castor oil and 36 moles of EO; the reaction product of one mole of tallowamine and 10 moles of EO; the reaction product of one mole of nonyl phenol and 10 moles of EO; the reaction product of one mole of nonyl phenol, 30 moles of PO, and 30 moles of EO; the reaction product of one mole of tall oil fatty acid and 12 moles of EO; and the reaction product of one mole of lauryl alcohol and 8 moles of EO.

One class of nonionic surfactants employable in the present technology is characterized by the formula (3):

$$RO(CH_2CH_2O)_nH \qquad (3)$$

where:
R is a radical selected from the group consisting of alkyl phenyl radicals wherein the alkyl group in each such radical contains about four to eighteen carbon atoms, and alkyl radicals each containing from six through twenty carbon atoms, and n is a positive whole number from 3 to 125 or a whole number sufficient to keep the molecular weight of the product surfactant below about 1500.

Some of the nonionic surfactants employable in the practice of the present technology can be characterized by containing block units of ethylene oxide in combination with block units of propylene oxide or butylene oxide. Thus the hydrophobic part of a molecule may contain recurring butylene oxide or propylene oxide units or mixed units of butylene oxide and propylene oxide. Minor amounts of ethylene oxide may also be present within the blocks of propylene oxide or butylene oxide. Thus, the hydrophobic portion may consist of a polyoxyalkylene block derived from alkylene oxides with at least three carbon atoms, an alkyl, aryl, or alkaryl hydrocarbon group with at least six carbon atoms, as for instance from a fatty alcohol, or a combination of one or more such polyoxyalkylene blocks and one or more such hydrocarbon groups. Typically, the hydrophilic portion of the nonionic surfactants employed herein is comprised of ethylene oxide units.

One preferred class of nonionic surfactants contains at least one block polyoxypropylene group containing at least about 5 propoxy units and also at least one block polyoxyethylene group containing at least about 5 ethoxy units.

One class of nonionic surfactant is characterized by having: (1) a molecular weight of at least from about 3000 to 6000, (2) at least one block polyoxypropylene group which contains from about 10 to 70 repeating propoxy units, (3) at least one block polyoxyethylene group which contains from about 10 to 100 repeating ethoxy units, and (4) both a hydrophobic moiety and a hydrophilic moiety.

In such a nonionic surfactant as above characterized, the total alkoxyl content must include at least 10 weight percent of ethylene oxide, and preferably the ethylene oxide content ranges from about 20 to 60 weight percent, and most preferably the ethylene oxide content ranges from about 30 to 50 weight percent. Preferably such a nonionic surfactant is end capped with at least one ethylene oxide group.

Typically, the amount of the nonionic surfactant used in aromatic polyester polyol blends of the present technology, based on the combined weight of aromatic polyester polyol and nonionic surfactant, is generally from about 1% to about 30% by weight, more preferably about 4% to about 26% by weight, and most preferably about 6% to about 20% by weight. The amount of nonionic surfactant, when used in reacted aromatic polyester polyols of the present technology, based on the combined weight of the aromatic polyester polyol and nonionic surfactant, is generally from about 1% to about 15% by weight.

Several benefits and advantages are achieved from reacting a hydrophobic material into the aromatic acid based polyester polyol and thereby enabling the natural oil based polyol and the aromatic acid based polyester polyol to form a miscible blend. For example, the polyol blend has a reduced viscosity, compared to one containing an aromatic acid based polyester polyol without reacted hydrophobic material. This results in less energy needed to compatibilize the polyol blend with blowing agents, isocyanates, catalysts and other optional components typically used to make polyurethane and polyisocyanurate foams. Further, less energy is required to pump and mix the foam components. A further benefit realized by the blend of aromatic acid based polyester polyol and natural oil based polyol is the ability to supply physically stable, single phase polyol blends while utilizing biorenewable materials.

The polyol blends of the present technology are mixed with other components, including, for example, blowing agents, catalysts, flame retardants and cell stabilizers, to form resin blends. Such components are known to those of skill in the art. Resin blends are further blended with polyisocyanates in order to make polyurethane and polyisocyanurate foams. Phase stability in a resin blend enables the supply of physically stable, single phase resin blends for commercial use. A benefit to having a reduced viscosity is improved wet-out of the foaming mix on the foam substrate. Improved wet-out can lead to a more uniform and finer cell structure, reduced k-factor, increased dimensional stability, and improved process efficiencies (e.g., density/cost reduction).

In further embodiments of the present technology, aromatic polyester polyol compositions are provided where the components of the aromatic polyester polyol are transesterified and/or esterified to provide aromatic polyester polyols that provide improved characteristics when used in foams over the polyol blends containing natural oil polyols. In one embodiment, the present technology provides aromatic polyester polyol compositions comprising: (i) at least one aromatic acid component; (ii) at least one hydroxylated component; (iii) at least one functionalized natural oil component; and (iv) optionally at least one catalyst component to form a reaction mixture. The reaction mixture can undergo an esterifying and/or transesterifying reaction to form an aromatic polyester polyol composition. The aromatic polyester polyol composition may further comprise (v) at least one non-functionalized natural oil component.

In other aspects of the present technology, there are provided foam forming compositions comprising at least one diisocyanate component and/or at least one polyisocyanate component; and at least one aromatic polyester polyol component comprising: (i) at least one aromatic acid component; (ii) at least one hydroxylated component; (iii) at least one functionalized natural oil component; and (iv) optionally at least one catalyst component. The aromatic polyester polyol is formed by esterification and/or transesterification. The aromatic polyester polyol can further include (v) a non-functionalized natural oil component. In other embodiments, the aromatic polyester polyol further comprises a nonionic surfactant.

In still further aspects of the present technology, there are provided polyisocyanurate foams formed by the reaction of a polyisocyanate composition with an aromatic polyester polyol composition comprising: (i) at least one aromatic acid component; (ii) at least one hydroxylated component; (iii) at least one functionalized natural oil component; and (iv) optionally at least one catalyst component.

The functionalized natural oil component can be as described above. For example, the functionalized oil component can be prepared by reacting epoxidized soybean oil with an active hydrogen compound in the presence of a clay catalyst. The active hydrogen compound can be, for example, alcohols, amines, glycols, carboxylic acids, derivatives thereof, and combinations thereof. The clay catalyst can be, for example, vermiculite, bentonites, montmorillonites, derivatives thereof, and combinations thereof. A suitable clay catalyst is an acid treated montmorillonite clay.

In some embodiments, the aromatic polyester polyol composition can further comprise at least one non-functionalized oil as described herein. The non-functionalized natural oil component of the aromatic polyester polyol composition can comprise, for example, from about 1% to about 35%, alternatively about 3% to about 25% by weight, alternatively between about 3% to about 20%, alternatively between about 3% and about 10% of the aromatic polyester polyol composition The catalyst component of the aromatic polyester polyol composition can be, for example, at least one transition metal catalyst, alkali metal catalyst, at least one derivative thereof, and combinations thereof. The catalyst can also be a Lewis acid, a Bronsted acid, at least one derivative thereof, or combinations thereof.

The catalyst can be, for example, any member selected from the group consisting of titanates, zirconates, tin based catalysts, tetraisopropyl titanate, tetrabutyltitanate, dibutyl tin oxide, oxides of zinc, oxides of lead, oxides of antimony, at least one derivative thereof, and combinations thereof.

The catalyst can also be, for example, lithium, sodium, potassium, cesium alkoxides, derivatives thereof, and combinations thereof. For example, the catalyst can be sodium hydroxide, sodium methoxide, sodium ethoxide, sodium n-propoxide, sodium isopropoxide, sodium n-butoxide, sodium sec-butoxide, sodium iso-butoxide, sodium t-butoxide, potassium hydroxide, potassium methoxide, potassium ethoxide, potassium n-propoxide, potassium isopropoxide, potassium n-butoxide, potassium sec-butoxide, potassium iso-butoxide, potassium t-butoxide, lithium hydroxide, lithium ethoxide, lithium n-propoxide, lithium isopropoxide, lithium n-butoxide, lithium sec-butoxide, lithium iso-butoxide, lithium t-butoxide, cesium hydroxide, cesium methoxide, cesium ethoxide, cesium n-propoxide, cesium isopropoxide, cesium n-butoxide, cesium sec-butoxide, cesium iso-butoxide, cesium t-butoxide, at least one derivative thereof, or combinations thereof.

The catalyst comprises from about 0 to about 2000 ppm by weight of the aromatic polyester polyol composition, alternatively from about 5 to about 2000 ppm of the aromatic polyester polyol composition.

In another embodiment of the present invention, a functionalized natural oil (or natural oil polyol) is reacted into an aromatic polyester polyol. The aromatic polyester polyol composition can be produced, for example, by a process comprising the steps of: (i) providing at least one aromatic acid component; at least one hydroxylated component; at least one functionalized natural oil component; and optionally at least one catalyst component to form a reaction mixture; and (ii) esterifying and/or transesterifying the reaction mixture to form an aromatic polyester polyol composition. In some embodiments, the step of (i) further includes providing at least one non-functionalized natural oil component.

The aromatic polyester polyol can also be produced, for example, by first reacting the functionalized natural oil component with an hydroxylated component to form a reaction mixture; and then transesterifying or esterifying the reaction mixture with the aromatic component mixture to form the aromatic polyester polyol. The functionalized natural oil component can be, for example, an epoxidized oil (including for example the epoxidized version of any of the natural oils mentioned herein). The aromatic component mixture can be an aromatic acid, a mixture of aromatic acids, a mixture of aromatic acids and hydroxylated components, or optionally an aromatic polyester polyol or mixtures of aromatic polyester polyol and either aromatic acids or hydroxylated components.

In some embodiments of the present technology, the polyester polyol composition may be reacted with about 5% to about 40%, alternatively about 15% to about 35% of at least one functionalized natural oil component.

The reaction temperature can be, for example, from about 180° to about 250° C. The reaction pressure can be, for example, from about 0.01 psia to about 45 psia.

The aromatic polyester polyol composition can further comprise at least one additive. The additive can be for example a nonionic surfactant, a blowing agent, a flame retardant, a deodorant, a foaming catalyst, a colorant, derivatives thereof, and combinations thereof.

The aromatic polyester polyol and aromatic polyester polyol/natural oil blends of the present technology can be used in preparation of both polyurethane and polyisocyanurate resins and foams. In some embodiments, the "B" side or foam masterbatch includes, but is not limited to aromatic polyester polyols, chemical or physical blowing agents, and a foaming catalyst. Methods of making foams are known to those familiar with the technology. The foams prepared using any of the aromatic polyester polyol compositions disclosed herein can be, for example, rigid foams. In still further aspects of the present technology, the foams can be, for example, closed cell rigid polyurethane foams, or urethane-modified polyisocyanurate foams.

Blowing agents suitable for use in the preparation of polyisocyanurate or polyurethane foams are known to those familiar with the technology and include aliphatic or cycloaliphatic $C_4$-$C_7$ hydrocarbons, water, mono- and polycarboxylic acids having a molecular weight of from 46 to 300, salts of these acids, and tertiary alcohols. Suitable blowing agents are further described, for example, in U.S. Pat. No. 5,922,779, which is herein incorporated by reference. Particularly suitable blowing agents for use herein are pentane blowing agents, including cyclopentane, n- and isopentane, and mixtures thereof. Also, mixtures and combinations of different blowing agents can be used.

EXAMPLES

Description of Components Used in the Following Examples

1) PA Polyol 1: PA/DEG (phthalic anhydride/diethylene glycol) aromatic polyester polyol with 8% SBO (soybean oil) transesterified into the PA/DEG aromatic polyester polyol, OH value=nominal 262 mg KOH/g, AV (acid value)= nominal 2 mg KOH/g.
2) PA polyol 2: PA/DEG aromatic polyester polyol with OH value=nominal 315 mg KOH/g, AV=nominal 2 mg KOH/g.
3) PA polyol 3: PA/DEG aromatic polyester polyol with 5% of a nonionic surfactant and 7.5% of a phosphorus based flame retardant blended in.
4) Castor oil, nominal OH value=164 mg KOH/g, AV nominal <3 mg KOH/g.
5) ESO polyol 1: Epoxidized soybean oil (VIKOFLEX 7170)+diethylene glycol reacted such that 97% of the epoxy groups have been reacted, nominal OH value=295 mg KOH/g AV=0.21 mg KOH/g.
6) ESO polyol 2: Vikol 1 available from Arkema, which is a polyol based on expoxidized soybean oil, and has OH value=170 mg KOH/g. It is believed to contain secondary hydroxyl groups.
7) SBO polyol 1: PELSOY 744 (Pelron Corp.), believed to be soybean oil transamidated with diethanolamine. Has amine number=0.43 meq/g, OH value=443.
8) SBO polyol 2: PELSOY P-750 (Pelron Corp.), believed to be soybean oil transamidated with diethanolamine. Has amine number=0.18 meq/g, OH value=288.
9) SBO polyol 3: SOYOYL R3-170 (Urethane Soy Systems Co., OH value=170.
10) PA polyol 4: PA/DEG/glycerine aromatic polyester polyol with 10% triglyceride oil (SBO) transesterified in, OH value=240 mg KOH/g, functionality=2.4.
11) PA polyol 6: PA/DEG/glycerine aromatic polyester polyol with 50% triglyceride oil transesterified in, OH value=240 mg KOH/g, functionality=1.9.
12) PA polyol 7: PA/DEG/glycerine aromatic polyester polyol with 30% triglyceride oil transesterified in, OH value=240 mg KOH/g, functionality=2.15.
13) STEPANPOL® PS-2402, available from Stepan Co., is a PA-DEG polyol, nominal OH value=250.
14) 1929-95A is a PA-DEG aromatic polyester polyol with 18% SBO transesterified into the PA-DEG aromatic polyester polyol, OH value=268.
15) Toximul® 8240, available from Stepan Co., is a nonionic surfactant that is a reaction product of one mole of castor oil and 36 moles ethylene oxide (EO).
16) Surfactant 2 is a nonionic surfactant that is the reaction product of one mole of NEODOL® 45 (a linear $C_{14}$-$C_{15}$ alcohol available from Shell Chemical Co.), 14 moles of propylene oxide (PO), and 11 moles of ethylene oxide (EO).

17) Fyrol® CEF is tri-(2-chloroethyl) phosphate, a flame retardant produced by Supresta LLC.

by hand stirring. The initial appearance of each of the mixtures was noted. The mixtures were then allowed to cool overnight and then the compatibility of each of the mixtures was noted. The results for each of the mixtures are reported in Table 1.

TABLE 1

| Run No. | Aromatic Polyester Polyol | % Transesterified Oil in Aromatic Polyester Polyol | Renewable Polyol Added | Wt. % Renewable Polyol | Appearance After mixing | Appearance After 1 day | Compatibility |
|---|---|---|---|---|---|---|---|
| 1 | PA polyol 1 | 8 | castor oil | 25 | cloudy | separated | separates |
| 2 | PA polyol 4 | 10 | castor oil | 25 | cloudy | separated | separates |
| 3 | PA polyol 7 | 30 | castor oil | 25 | cloudy | separated | separates |
| 4 | PA polyol 6 | 50 | castor oil | 25 | cloudy | cloudy, no separation | single phase, cloudy |
| 5 | PA polyol 2 | 0 | ESO polyol 1 | 25 | cloudy | separated | separates |
| 6 | PA polyol 3 | 0 | ESO polyol 1 | 25 | cloudy | separated | separates |
| 7 | PA polyol 1 | 8 | ESO polyol 1 | 25 | cloudy | cloudy, no separation | single phase, cloudy |
| 8 | PA polyol 1 | 8 | ESO polyol 1 | 40 | clear | clear | single phase, clear |
| 9 | PA polyol 7 | 30 | ESO polyol 1 | 25 | clear | clear | single phase, clear |
| 10 | PA polyol 7 | 30 | ESO polyol 1 | 40 | clear | clear | single phase, clear |
| 11 | PA polyol 1 | 8 | ESO polyol 2 | 25 | cloudy | separated | separates |
| 12 | PA polyol 7 | 30 | ESO polyol 2 | 25 | cloudy | cloudy, no separation | single phase, cloudy |
| 13 | PA polyol 6 | 50 | ESO polyol 2 | 25 | cloudy | cloudy, no separation | single phase, cloudy |
| 14 | PA polyol 2 | 0 | SBO polyol 1 | 25 | cloudy | separated | separates |
| 15 | PA polyol 1 | 8 | SBO polyol 1 | 25 | cloudy | separated | separates |
| 16 | PA polyol 7 | 30 | SBO polyol 1 | 25 | clear | clear | single phase, clear |
| 17 | PA polyol 2 | 0 | SBO polyol 2 | 25 | cloudy | separated | separates |
| 18 | PA polyol 1 | 8 | SBO polyol 2 | 25 | cloudy | separated | separates |
| 19 | PA polyol 7 | 30 | SBO polyol 2 | 25 | clear | clear | single phase, clear |
| 20 | PA polyol 1 | 8 | SBO polyol 3 | 25 | cloudy | separated | separates |
| 21 | PA polyol 6 | 50 | SBO polyol 3 | 25 | cloudy | cloudy, no separation | single phase, cloudy |

18) Polycat® 5 is pentamethyldiethylenetriamine, a catalyst produced by Air Products and Chemicals, Inc.

19) Dabco® K-15 is a solution of potassium 2-ethylhexanoate produced by Air Products and Chemicals, Inc.

20) Tegostab® B-8512 is a silicone cell-stabilizing surfactant produced by Goldschmidt division of Degussa AG.

21) Mondur® 489 is a polymeric isocyanate produced by Bayer Corporation.

22) 22) Polycat® 8 is dimethylcyclohexylamine, a catalyst produced by Air Products and Chemicals, Inc.

23) Tegostab® B-8513 is a silicone cell-stabilizing surfactant produced by Goldschmidt division of Degussa AG.

24) Niax L-5440 is a silicone cell-stabilizing surfactant produced by GE Advanced Materials, a division of General Electric Company.

Example 1

Phase Stable Polyol Blends

Mixtures of phthalic acid based polyester polyols and renewable polyols (natural oil) were prepared by combining the two materials in a scintillation vial in the ratios noted in Table 1 below. The aromatic polyol was added first and the renewable polyol was added second. The scintillation vial was then heated to 60° C. and the materials were mixed well From the results in Table 1, it can be seen that the aromatic polyols that contained no amount of transesterified triglyceride oil were completely incompatible with the natural oil (renewable) polyol and resulted in cloudy mixtures that separated into separate phases. However, when the triglyceride oil was transesterified into the aromatic polyester polyol, mixtures of the aromatic polyol and renewable polyol were obtained that formed a single phase with no separation. It should also be noted that the amount of transesterified oil in the aromatic polyol is important for providing compatibility depending upon the renewable polyol to be compatibilized. For example, PA polyol 1 which contained 8% transesterified triglyceride oil could not compatibilize 25 weight % castor oil (Run no. 1), but could compatibilize 40 weight % ESO polyol 1 (Run no. 8). On the other hand, by increasing the amount of transesterified oil in the aromatic polyester polyol to 50% (PA polyol 6), 25 weight % castor oil could be compatibilized (Run no. 4).

Example 2

Use of Nonionic Surfactants and Transesterified Natural Oil in Phase Stable Polyol Blends In this example, mixtures of aromatic polyester polyols and renewable polyols were evaluated with and without added nonionic surfactants for compatibility. The types and amounts of polyols comprising each mixture and the compatibility results are reported in Table 2.

TABLE 2

| Run No. | Aromatic Polyester Polyol | Compatibilizer(s)* | Renewable Polyol Added | Max % Renewable Polyol Compatible** |
|---|---|---|---|---|
| 1 | STEPANPOL PS-2402 | none | castor oil | <1 |
| 2 | 1929-95A | 18% reacted SBO | castor oil | 4 |
| 3 | 1929-95A | 15.3% reacted SBO, 15% Toximul 8240 | castor oil | 6 |
| 4 | STEPANPOL PS-2402 | none | Vikol 1 | <1 |
| 5 | 1929-95A | 18% reacted SBO | Vikol 1 | 5 |
| 6 | 1929-95A | 15.3% reacted SBO, 15% Toximul 8240 | Vikol 1 | 8 |

*Percentages based on final composition, aromatic polyester polyol with compatibilizers, before renewable polyol addition.
**"Compatible" means clear or slightly hazy, no separation of phases. Above this level, mixture becomes very hazy, and separates on standing. Percentages based on total blend, aromatic polyester polyol + compatibilizers + renewable polyol.

From the results in Table 2, it can be seen that the combination of a nonionic surfactant and an aromatic polyester polyol transesterified with a triglyceride oil can compatibilize more of a natural (renewable) oil than the aromatic polyester polyol without the nonionic surfactant.

Example 3

Nonionic Surfactant as Sole Compatibilizer for Phase Stable Polyol Blends

In this example, a nonionic surfactant is used as the only compatibilizer for the mixtures of aromatic polyester polyols and renewable polyols. In other words, the aromatic polyester polyol contained no transesterified triglyceride oil. The polyols and nonionic surfactants used for each mixture and the compatibility results obtained are reported in Table 3.

TABLE 3

| No. | Aromatic Polyester Polyol | Compatibilizer | Renewable Polyol Added | Max % Renewable Polyol Compatible (1 hour, room temperature) |
|---|---|---|---|---|
| 1 | STEPANPOL PS-2402 | None | ESO Polyol 1 | 1 |
| 2 | STEPANPOL PS-2402 | 14% Toximul 8240 | ESO Polyol 1 | 6 |
| 3 | STEPANPOL PS-2402 | 13% Surfactant 2 | ESO Polyol 1 | 15 |

Percentages based on total blend, aromatic polyester polyol + compatibilizer + renewable polyol.
"Compatible" means clear or slightly hazy, no separation of phases.

The results in Table 3 demonstrate that a nonionic surfactant can effectively compatibilize a renewable polyol.

Example 4

Foams Comprising Phase Stable Polyol Blends

Closed-cell polyurethane-modified polyisocyanurate foams were produced from resin blends utilizing phase-stable polyol-nonionic surfactant blends of the present technology (Samples 4-6). The indicated resin blend and isocyanate, at 20° C., were combined in a paper cup and agitated for 6 seconds using a motor-driven mixing blade rotating at 3400 rpm. Foaming test results and properties of the resulting foams are reported in Table 4. Aromatic polyester polyol compositions of the present technology are thus shown to produce polyisocyanate-based foams with acceptable strength and cell structure.

TABLE 4

|  | Foam A | Foam B | Foam C |
|---|---|---|---|
| Resin blend composition (php): |  |  |  |
| PA Polyol 1 | 72.00 | 54.00 | 36.00 |
| ESO Polyol 1 | 20.00 | 40.00 | 60.00 |
| Nonionic surfactant | 8.00 | 6.00 | 4.00 |
| Fyrol CEF | 10.20 | 10.40 | 10.70 |
| Polycat 5 | 0.20 | 0.21 | 0.21 |
| Dabco K-15 | 3.38 | 3.48 | 3.55 |
| Tegostab B-8512 | 2.05 | 2.10 | 2.15 |
| Water | 0.50 | 0.50 | 0.50 |
| n-pentane | 21.60 | 22.20 | 22.80 |
| Total resin blend | 137.93 | 138.89 | 139.91 |
| Isocyanate: |  |  |  |
| Mondur 489 polymeric isocyanate (php) | 176.53 | 184.16 | 191.72 |
| Isocyanate index | 250 | 250 | 250 |
| Foaming test: reactivity: |  |  |  |
| Cream time (sec) | 13 | 15 | 19 |
| Gel time (sec) | 42 | 46 | 51 |
| Foam density (lb./cu. ft.) | 1.69 | 1.65 | 1.74 |
| Foam properties: |  |  |  |
| Cell structure | Fine, regular | Fine, regular | Fine, regular |
| Compressive strength (parallel, psi) | 20.3 | 18.2 | 18.1 |

Example 5

Preparation of Aromatic Polyester Polyols

There are provided processes for preparing aromatic polyester polyols that contain natural oil components by transesterifying the natural oil component into the aromatic polyester polyol. These processes produce aromatic polyester polyols having improved storage stability, and give rise to foams with improved properties.

There are also provided processes for preparing aromatic polyester polyols that contain natural oil components, such as oil components derived from epoxidized soybean oil (ESO), by first prereacting the epoxidized soybean oil component with an active hydrogen containing radical and then transesterifying the reacted ESO component into the aromatic polyester polyol. The active hydrogen radical can be obtained from, for example, alcohols, glycols, amines, thiols, or acids. These processes incorporate functionalized oils into the aromatic polyester polyol.

There are also provided processes for preparing aromatic polyester polyols that contain natural oil components derived from epoxidized soybean oil by reacting the epoxidized soybean oil component with an active hydrogen containing radical in the presence of the aromatic acid thereby reacting the epoxide moiety and conducting the transesterification of the ESO component simultaneously with the esterification reaction between the aromatic acid and the active hydrogen containing radical. The reaction can be conducted at temperatures ranging from about 160° C. to about 250° C., depending upon the catalyst used. Suitable catalysts include transition metal catalysts, and acids. These processes shorten the cycle time by conducting the transesterification reaction in concert with the esterification reaction.

There are also provided processes for preparing natural oil polyols from epoxidized soybean oil and active hydrogen containing compounds by using solid clay catalysts. These processes allow for the filtration and reuse of the catalyst for conducting the functionalization of the natural oil polyol. Use of a clay catalyst also results in low color natural oil polyols since the clay acts as a bleaching agent.

Polyol A: 20 mols of aromatic diacid and 36.4 mols of DEG were charged to a reactor affixed with stirring, nitrogen sparge, packed column, condenser with receiver, and temperature control and then heated to 180° C. under nitrogen sparge. When the temperature reached 180° C., a transition metal catalyst was added and the temperature raised to 230° C. When the acid value (AV) had reached 3 mg KOH/g, 0.66 mols of soybean oil were charged to the reactor and the oil was transesterified into the reaction mix for 5 hours at 210° C. Transesterification was verified by the clear appearance of the polyol when a sample was cooled to 20° C. and also by gel permeation chromatography. The DEG lost during the transesterification reaction was replaced by adding an equivalent amount of DEG, and then transesterifying the DEG into the polyol by heating to 190° C. for approximately 1 hour to obtain a polyol having an OHv of 261.

Polyol B is a commercially available polyol based on ring opened epoxidized soybean oil. It has OHv=175, AV=0.2, and viscosity @ 25° C.=845 cps.

Polyol 1: 3.98 mols of aromatic diacid and 7.09 mols of diethylene glycol (DEG) were charged to a reactor affixed with stirring, nitrogen sparge, packed column, condenser with receiver, and temperature control and then heated to 190° C. under nitrogen sparge. When the temperature reached 190° C. a transition metal catalyst was added and the temperature raised to 230° C. When the acid value (AV) had reached 1 mg KOH/g, 0.78 mols of castor oil were charged to the reactor and the oil transesterified into the reaction mix for 5.5 hours at 230° C. Transesterification was verified by the clear appearance of the polyol when a sample was cooled to 20° C. and also by gel permeation chromatography. The DEG lost during the reaction was replaced by adding an equivalent amount of DEG and then transesterifying the DEG into the polyol by heating to 190° C. for approximately 1 hour. This yielded a polyol with 36 wt % castor oil.

Polyol 2: 1644 g of commercially available epoxidized soybean oil (ESO) with 7% oxirane, 884 g DEG, and 4 g potassium methoxide were charged to a reactor affixed with stirring, nitrogen sparge, packed column, condenser with receiver, and temperature control and then heated to 180° C. under nitrogen sparge. The material was initially 2 phases but coalesced when the temperature reached 120° C. The reaction was continued at 180° C. for 8 hours and then raised to 200° C. for 8 hours. The final oxirane value of the reaction mix was 0.2% indicating 96% conversion of the initial oxirane. Reaction of the DEG with the ESO was also verified by gel permeation chromatography. The final AV was 0.21 and the final OHv was 295.

Polyol 3: 10.00 mols of aromatic diacid and 16.99 mols of DEG were charged to a reactor affixed with stirring, nitrogen sparge, packed column, condenser with receiver, and temperature control and then heated to 180° C. under nitrogen sparge. When the temperature reached 180° C., a transition metal catalyst was added and the temperature raised to 230° C. When the acid value (AV) had reached 2.7 mg KOH/g 1.05 mols of castor oil were charged to the reactor and the oil transesterified into the reaction mix for 3 hours at 220° C. Transesterification was verified by the clear appearance of the polyol when a sample was cooled to 20° C. and also by gel permeation chromatography. The DEG lost during the reaction was replaced by adding an equivalent amount of DEG and then transesterifying the DEG into the polyol by heating to 190 C for approximately 1 hour. This yielded a polyol with 24 wt % castor oil.

Polyol 4: 12.93 mols of aromatic diacid and 21.50 mols of DEG were charged to a reactor affixed with stirring, nitrogen sparge, packed column, condenser with receiver, and temperature control and then heated to 180° C. under nitrogen sparge. When the temperature reached 180° C. a transition metal catalyst was added and the temperature raised to 230° C. When the acid value (AV) had reached 1.47 mg KOH/g 0.59 mols of castor oil were charged to the reactor and the oil transesterified into the reaction mix for 5.5 hours at 210° C. Transesterification was verified by the clear appearance of the polyol when a sample was cooled to 20° C. and also by gel permeation chromatography. The DEG lost during the reaction was replaced by adding an equivalent amount of DEG and then transesterifying the DEG into the polyol by heating to 190° C. for approximately 1 hour. This yielded a polyol with 12 wt % castor oil.

Polyol 5: 1081 g Polyol A and 300 g polyol 2 were charged to a reactor affixed with stirring, nitrogen sparge, packed column, condenser with receiver, and temperature control and then heated to 190° C. under nitrogen sparge and held there for 2 hours. Transesterification was verified by the clear appearance of the polyol when a sample was cooled to 20° C. and also by gel permeation chromatography. This polyol was cooled to 85° C. and 120 g of a nonionic surfactant was added. This yielded a polyol with 6 wt % SBO and 13% ESO and 8% nonionic surfactant.

Polyol 6: 810 g Polyol A and 600 g polyol 2 were charged to a reactor affixed with stirring, nitrogen sparge, packed column, condenser with receiver, and temperature control and then heated to 190° C. under nitrogen sparge and held there for 5 hours. Transesterification was verified by the clear appearance of the polyol when a sample was cooled to 20° C. and also by gel permeation chromatography. This polyol was cooled to 65° C. and 90 g of a nonionic surfactant was added. This yielded a polyol with 4 wt % SBO and 26% ESO and 6% nonionic surfactant.

Polyol 7: 347 g Polyol A and 557 g polyol 2 were charged to a reactor affixed with stirring, nitrogen sparge, packed column, condenser with receiver, and temperature control and then heated to 190° C. under nitrogen sparge and held there for 2.5 hours. Transesterification was verified by the clear appearance of the polyol when a sample was cooled to 20° C. and also by gel permeation chromatography. This polyol was cooled overnight and then reheated to 100° C. and 38 g of a nonionic surfactant was added. This yielded a polyol with 3 wt % SBO, 38% ESO and 4% nonionic surfactant.

Polyol 8: 12 mols of aromatic diacid, 19.2 mols of DEG, and 0.73 mols castor oil were charged to a reactor affixed with stirring, nitrogen sparge, packed column, condenser with receiver, and temperature control and then heated to 190° C. under nitrogen sparge. When the temperature reached 190° C., a transition metal catalyst was added and the temperature raised to 220° C. and reaction continued until AV<2 was achieved. Transesterification of the castor oil was verified by the clear appearance of the polyol when a sample was cooled to 20 C. This yielded a polyol with 16 wt % castor oil.

Polyol 9: 2166 g of Polyol 8 was charged to a reactor affixed with stirring, nitrogen sparge, packed column, condenser with receiver, and temperature control and then heated to 80° C. under nitrogen sparge. When the temperature reached 80° C., 114 g of a nonionic surfactant was added and the OHv was adjusted by addition of 38 g DEG. This yielded a polyol with 15 wt % castor oil and 5% nonionic surfactant.

Polyol 10: 12 mols of aromatic diacid, 19.2 mols of DEG, and 1.3 mols castor oil were charged to a reactor affixed with stirring, nitrogen sparge, packed column, condenser with receiver, and temperature control and then heated to 190 C under nitrogen sparge. When the temperature reached 190° C., a transition metal catalyst was added and the temperature raised to 220° C. and reaction continued until AV<2 was achieved. Transesterification of the castor oil was verified by the clear appearance of the polyol when a sample was cooled to 20° C. The DEG lost during the reaction was replaced by adding an equivalent amount of DEG and then transesterifying the DEG into the polyol by heating to 190° C. for approximately 1 hour. This yielded a polyol with 25 wt % castor oil.

Polyol 11: 2295 g of Polyol 10 was charged to a reactor affixed with stirring, nitrogen sparge, packed column, condenser with receiver, and temperature control and then heated to 80° C. under nitrogen sparge. When the temperature reached 80° C., 121 g of a nonionic surfactant was added and the OHv was adjusted by addition of 38 g DEG. This yielded a polyol with 24 wt % castor oil and 5% nonionic surfactant.

Polyol 12: 5.9 mols of aromatic diacid, 11.1 mols of DEG, and 0.81 mols castor oil were charged to a reactor affixed with stirring, nitrogen sparge, packed column, condenser with receiver, and temperature control and then heated to 180° C. under nitrogen sparge. When the temperature reached 165° C., a transition metal catalyst was added and the temperature raised to 220° C. and reaction continued until AV<2 was achieved. Transesterification of the castor oil was verified by the clear appearance of the polyol when a sample was cooled to 20° C. and also by gel permeation chromatography. The DEG lost during the reaction was replaced by adding an equivalent amount of DEG and then transesterifying the DEG into the polyol by heating to 190° C. for approximately 1 hour. This polyol was cooled to 65° C. and 304 g of a nonionic surfactant was added. This yielded a polyol with 25 wt % castor oil and 10% nonionic surfactant.

Polyol 13: 7 mols of aromatic diacid, 12.6 mols of DEG, and 0.5 mols castor oil were charged to a reactor affixed with stirring, nitrogen sparge, packed column, condenser with receiver, and temperature control and then heated to 180° C. under nitrogen sparge. When the temperature reached 180° C., a transition metal catalyst was added and the temperature raised to 220° C. and reaction continued until AV<2 was achieved. Transesterification of the castor oil was verified by the clear appearance of the polyol when a sample was cooled to 20° C. and also by gel permeation chromatography. The DEG lost during the reaction was replaced by adding an equivalent amount of DEG and then transesterifying the DEG into the polyol by heating to 190° C. for approximately 1 hour. This polyol was cooled to 65° C. and 315 g of a nonionic surfactant was added. This yielded a polyol with 15 wt % castor oil and 10% nonionic surfactant.

Polyol 14: 5.9 mols of aromatic diacid and 11.2 mols of DEG were charged to a reactor affixed with stirring, nitrogen sparge, packed column, condenser with receiver, and temperature control and then heated to 230° C. under nitrogen sparge. When the temperature reached 185° C. a transition metal catalyst was added and the temperature raised to 230° C. When the acid value (AV) had reached 1.2 mg KOH/g 750 g of Polyol B were charged to the reactor and the oil transesterified into the reaction mix for 2 hours at 230° C. Transesterification was verified by the clear appearance of the polyol when a sample was cooled to 20° C. and also by gel permeation chromatography. The DEG lost during the reaction was replaced by adding an equivalent amount of DEG and then transesterifying the DEG into the polyol by heating to 190° C. for approximately 2.5 hour. The polyol was cooled to 100 C and 303 g of nonionic surfactant was added. This yielded a polyol with 25 wt % ESO based polyol B and 10% surfactant.

Polyol 15: 742 g of commercially available epoxidized soybean oil (ESO) with 7% oxirane, 1884 g DEG, and 5 g potassium methoxide were charged to a reactor affixed with stirring, nitrogen sparge, packed column, condenser with receiver, and temperature control and then heated to 200° C. under nitrogen sparge. The material was initially 2 phases but coalesced when the temperature reached 120° C. The reaction was continued at 200° C. for 11 hours. The final oxirane value of the reaction mix was 0.09% indicating 95% conversion of the initial oxirane. The final OHv was 707 mg KOH/g.

Polyol 16: 1724 g of polyol 15 and 5.8 mols of aromatic diacid were charged to a reactor affixed with stirring, nitrogen sparge, packed column, condenser with receiver, and temperature control and then heated to 220° C. under nitrogen sparge. When the temperature reached 200° C. a transition metal catalyst was added and the temperature raised to 220° C. and reacted for approximately 6 hours until the AV was 1.7. The DEG lost during the reaction was replaced by adding an equivalent amount of DEG and then transesterifying the DEG into the polyol. 225 g SBO was added and the reaction mixture heated to 220° C. for 4 hours to transesterify in the SBO. Cool the reaction mixture to 100° C. and add 300 g nonionic surfactant. This yields a polyol with 16.5% ESO, 7.5% SBO, 10% nonionic surfactant.

Polyol 17: 4.5 mols of aromatic diacid, 9.8 mols of DEG, and 0.7 mols of commercially available epoxidized soybean oil (ESO) with 7% oxirane were charged to a reactor affixed with stirring, nitrogen sparge, packed column, condenser with receiver, and temperature control and then heated to 220° C. under nitrogen sparge. When the temperature reached 165° C. a transition metal catalyst was added and the temperature raised to 220° C. When the acid value (AV) had reached 0.95 mg KOH/g the reaction mass was cooled and when the temperature reached 100° C. 247 g of a nonionic surfactant were added. Transesterification of the ESO was verified by the clear appearance of the polyol when a sample was cooled to 20° C. and also by gel permeation chromatography. This yielded a polyol with 25 wt % ESO and 10% nonionic surfactant.

Polyol 18: 5.6 mols of aromatic diacid, 10.9 mols of DEG, and 0.4 mols of commercially available epoxidized soybean oil (ESO) with 7% oxirane were charged to a reactor affixed with stirring, nitrogen sparge, packed column, condenser with receiver, and temperature control and then heated to 220° C. under nitrogen sparge. When the temperature reached 165° C. a transition metal catalyst was added and the temperature raised to 220° C. When the acid value (AV) had reached 0.8 mg KOH/g the reaction mass was cooled and when the temperature reached 100° C. 249 g of a nonionic surfactant were added. Transesterification of the ESO was verified by the clear appearance of the polyol when a sample was cooled to 20° C. and also by gel permeation chromatography. This yielded a polyol with 15 wt % ESO and 10% nonionic surfactant.

Polyol 19: 4.5 mols of aromatic diacid, 9.8 mols of DEG, and 0.7 mols of SBO were charged to a reactor affixed with stirring, nitrogen sparge, packed column, condenser with receiver, and temperature control and then heated to 220° C. under nitrogen sparge. When the temperature reached 205° C. a transition metal catalyst was added and the temperature raised to 220° C. Transesterification of the SBO was verified by the clear appearance of the polyol when a sample was cooled to 20° C. and also by gel permeation chromatography.

The DEG lost during the reaction was replaced by adding an equivalent amount of DEG and then transesterifying the DEG into the polyol. The polyol was reheated to 100° C. and 266 g of nonionic surfactant was added. This yielded a polyol with 25 wt % SBO and 10% nonionic surfactant.

Polyol 20: 5.6 mols of aromatic diacid, 10.8 mols of DEG, and 0.4 mols of SBO were charged to a reactor affixed with stirring, nitrogen sparge, packed column, condenser with receiver, and temperature control and then heated to 220° C. under nitrogen sparge. When the temperature reached 165° C. a transition metal catalyst was added and the temperature raised to 220° C. Transesterification of the SBO was verified by the clear appearance of the polyol when a sample was cooled to 20° C. and also by gel permeation chromatography. The DEG lost during the reaction was replaced by adding an equivalent amount of DEG and then transesterifying the DEG into the polyol. The polyol was reheated to 90° C. and 250 g of nonionic surfactant was added. This yielded a polyol with 15 wt % SBO and 10% nonionic surfactant.

Polyol 21: 7.2 mols of aromatic diacid, 12.4 mols of DEG were charged to a reactor affixed with stirring, nitrogen sparge, packed column, condenser with receiver, and temperature control and then heated to 230° C. under nitrogen sparge. When the temperature reached 165° C. a transition metal catalyst was added and the temperature raised to 230° C. The DEG lost during the reaction was replaced by adding an equivalent amount of DEG and then transesterifying the DEG into the polyol. Transesterification of the DEG was verified by gel permeation chromatography. The polyol was reheated to 90° C. and 245 g of nonionic surfactant was added. This yielded a polyol with no oils and 10% nonionic surfactant.

Polyol 22: 1.06 mols of commercially available epoxidized soybean oil (ESO) with 7% oxirane, 9.4 mols of methanol, and 120 g of a commercially available acid treated clay (Engelhard F-24) were charged to a reactor affixed with stirring, nitrogen sparge, reflux condenser and temperature control and then heated to reflux for 12 hours. The clay was separated by filtration over filter aid and a 1 micron filter and the remaining methanol removed by vacuum filtration. The final oxirane value was 0.6 indicating a ~90% conversion of the oxirane functionality. The formation of the oligomeric polyol was verified by gel permeation chromatography. This yielded a polyol with AV=1.1 mg KOH/g and OHv=146 mg KOH/g.

Polyol 23: 4.0 mols of aromatic diacid, 7.4 mols of DEG and 500 g of polyol 22 were charged to a reactor affixed with stirring, nitrogen sparge, packed column, condenser with receiver, and temperature control and then heated to 190° C. under nitrogen sparge. When the temperature reached 165° C. a transition metal catalyst was added and the temperature raised to 220° C. The DEG lost during the reaction was replaced by adding an equivalent amount of DEG and then transesterifying the DEG into the polyol. The polyol was cooled to 90° C. and 199 g of nonionic surfactant was added. Transesterification of polyol 22 was verified by gel permeation chromatography. This yielded a polyol with 25% polyol 22 and 10% nonionic surfactant.

Polyol 24: 4.2 mols of aromatic diacid, 8.3 mols of DEG, and 1.0 mols castor oil were charged to a reactor affixed with stirring, nitrogen sparge, packed column, condenser with receiver, and temperature control and then heated to 180° C. under nitrogen sparge. When the temperature reached 180° C. a transition metal catalyst was added and the temperature raised to 220° C. and reaction continued until AV<1 was achieved. Transesterification of the castor oil was verified by the clear appearance of the polyol when a sample was cooled to 20° C. and also by gel permeation chromatography. The DEG lost during the reaction was replaced by adding an equivalent amount of DEG and then transesterifying the DEG into the polyol by heating to 190° C. for approximately 1 hour. This polyol was cooled to 90° C. and 262 g of a nonionic surfactant was added. This yielded a polyol with 35 wt % castor oil and 10% nonionic surfactant.

Polyol 25: 8.6 mols of aromatic diacid, 14.0 mols of DEG were charged to a reactor affixed with stirring, nitrogen sparge, packed column, condenser with receiver, and temperature control and then heated to 190° C. under nitrogen sparge. When the temperature reached 170° C. a transition metal catalyst was added and the temperature raised to 220° C. and reaction continued until AV~1 was achieved. The DEG lost during the reaction was replaced by adding an equivalent amount of DEG and then transesterifying the DEG into the polyol by heating to 190° C. for approximately 1 hour. This yielded a polyol with no oil and no nonionic surfactant.

Polyol 26: 5.6 mols of aromatic diacid, 10.9 mols of DEG, and 0.7 mols of commercially available epoxidized soybean oil (ESO) with 7% oxirane were charged to a reactor affixed with stirring, nitrogen sparge, packed column, condenser with receiver, and temperature control and then heated to 220° C. under nitrogen sparge. When the temperature reached 167° C. a transition metal catalyst was added and the temperature raised to 220° C. When the acid value (AV) had reached 0.8 mg KOH/g the reaction was stopped and the OHv was adjusted to the desired value by addition of the appropriate amount of aromatic diacid and DEG then reacting the acid and DEG into the polyol until the AV was 1.2. Transesterification of the ESO was verified by the clear appearance of the polyol when a sample was cooled to 20° C. and also by gel permeation chromatography. This yielded a polyol with 25 wt % ESO.

Polyol 27: 5.1 mols of aromatic diacid, 9.8 mols of DEG, and 0.5 mols castor oil were charged to a reactor affixed with stirring, nitrogen sparge, packed column, condenser with receiver, and temperature control and then heated to 180° C. under nitrogen sparge. When the temperature reached 180° C. a transition metal catalyst was added and the temperature raised to 220° C. and reaction continued until AV<1 was achieved. 0.2 mols SBO were added and the reaction continued for ~2 hours. Transesterification of the castor oil and SBO was verified by the clear appearance of the polyol when a sample was cooled to 20° C. and also by gel permeation chromatography. The DEG lost during the reaction was replaced by adding an equivalent amount of DEG and then transesterifying the DEG into the polyol by heating to 190° C. for approximately 1 hour. This polyol was cooled to 90° C. and 260 of a nonionic surfactant was added. This yielded a polyol with 17.5 wt % castor oil, 7.5 wt % SBO and 10% nonionic surfactant.

Polyol 28: 5.6 mols of aromatic diacid, 10.7 mols of DEG, and 0.7 mols castor oil were charged to a reactor affixed with stirring, nitrogen sparge, packed column, condenser with receiver, and temperature control and then heated to 180° C. under nitrogen sparge. When the temperature reached 180° C. a transition metal catalyst was added and the temperature raised to 220° C. and reaction continued until AV=1 was achieved. Transesterification of the castor oil was verified by the clear appearance of the polyol when a sample was cooled to 20° C. and also by gel permeation chromatography. The DEG lost during the reaction was replaced by adding an equivalent amount of DEG and then transesterifying the DEG into the polyol by heating to 190° C. for approximately 1 hour. This yielded a polyol with 25 wt % castor oil.

Polyol 29: 5.6 mols of aromatic diacid, 10.8 mols of DEG, and 0.7 mols of SBO were charged to a reactor affixed with stirring, nitrogen sparge, packed column, condenser with receiver, and temperature control and then heated to 210° C. under nitrogen sparge. When the temperature reached 165° C. a transition metal catalyst was added and the temperature raised to 210° C. Transesterification of the SBO was verified by the clear appearance of the polyol when a sample was cooled to 20° C. and also by gel permeation chromatography. The DEG lost during the reaction was replaced by adding an equivalent amount of DEG and then transesterifying the DEG into the polyol. This yielded a polyol with 25 wt % SBO.

The properties of each of the polyols as described above are summarized in the following Table 5:

The capability of producing phase-stable combinations of aromatic polyols and natural oil polyols is useful in any situation where the combination may be marketed or stored as a single product.

Preparation of Foams

Closed-cell polyurethane-modified polyisocyanurate foams were produced from reaction between the B-side resin and the A-side isocyanate. B-side resin blends were made by blending polyols, flame retardant, foaming catalyst, cell-stabilizing surfactant, and blowing agent together according to each formulation. The resin blend and isocyanate, at 20° C., were combined in a paper cup at a ratio calculated from the

TABLE 5

| Example # | OHv, mg KOH/g | AV, mg KOH/g | Viscosity, cps at 25 C. | Calculated Functionality | Oil Type | Oil level, wt % | Surfactant, wt % |
|---|---|---|---|---|---|---|---|
| Polyol A | 261 | 2 | | 1.92 | SBO | 7.5 | |
| Polyol B | 175 | 0.2 | 845 | | ESO | 100 | |
| Polyol 1 | 238 | 2.6 | 1700 | 2.2 | CO | 36 | |
| Polyol 2 | 295 | 0.21 | | | ESO | 65 | |
| Polyol 3 | 234 | 0.9 | 2790 | 2.31 | CO | 24 | |
| Polyol 4 | 235 | 1.6 | 5020 | 2.04 | CO | 12 | |
| Polyol 5 | 276 | 1.1 | 2310 | 2.4 | ESO/SBO | 13/6 | 8 |
| Polyol 6 | 289 | 0.6 | 2020 | 3.04 | ESO/SBO | 26/4.5 | 6 |
| Polyol 7 | 318 | 1.1 | 2145 | 3.87 | ESO/SBO | 38/3 | 4 |
| Polyol 8 | 219 | 1.95 | 5930 | 2.09 | CO | 15 | |
| Polyol 9 | 205 | 1.93 | 5260 | 2.06 | CO | 15 | 5 |
| Polyol 10 | 227 | 1.43 | 3285 | 2.14 | CO | 25 | |
| Polyol 11 | 219 | 1.28 | 3050 | 2.11 | CO | 24 | 5 |
| Polyol 12 | 243 | 1.55 | 1915 | 2.09 | CO | 25 | 10 |
| Polyol 13 | 234 | 1.8 | 2555 | 2.05 | CO | 15 | 10 |
| Polyol 14 | 230 | 0.6 | 2100 | | Polyol B | 25 | 10 |
| Polyol 15 | 707 | | | | ESO | 28.3 | |
| Polyol 16 | 235 | 1.7 | 2250 | 2.09 | ESO/SBO | 16.5/7.5 | 10 |
| Polyol 17 | 246 | 0.8 | 4200 | 2.25 | ESO | 25 | 10 |
| Polyol 18 | 242 | 0.91 | 4420 | 2.15 | ESO | 15 | 10 |
| Polyol 19 | 235 | 0.85 | 750 | 1.78 | SBO | 25 | 10 |
| Polyol 20 | 245 | 1 | 1215 | 1.84 | SBO | 15 | 10 |
| Polyol 21 | 240 | 1.5 | 4920 | 2 | none | | 10 |
| Polyol 22 | 146 | 1.1 | 7400 | 11.1 | ESO/MeOH | 100 | |
| Polyol 23 | 239 | 1.3 | 3385 | 2.32 | ESO/MeOH | 25 | 10 |
| Polyol 24 | 242 | 1.17 | 1328 | 2.13 | CO | 35 | 10 |
| Polyol 25 | 243 | 1.24 | 13400 | 2 | none | | |
| Polyol 26 | 235 | 1.2 | 10380 | 2.27 | ESO | 25 | |
| Polyol 27 | 242 | 0.89 | 1375 | 1.97 | CO/SBO | 17.5/7.5 | 10 |
| Polyol 28 | 240 | 1 | 2940 | 2.09 | CO | 25 | |
| Polyol 29 | 234 | 0.7 | 985 | 1.76 | SBO | 25 | |

The effect on polyol phase stability of reacting functionalized natural oil polyols into aromatic polyester polyols, as opposed to blending, is shown in Table 6. All of the combinations contain 75% aromatic polyol and 25% natural oil polyol.

TABLE 6

| Natural Oil Polyol | Method of Addition of Natural Oil Polyol | Final Polyol Reference (Table 1) | Final Polyol Appearance and Phase Stability |
|---|---|---|---|
| Polyol B (ESO based) | Blended | Not Applicable | Opaque, separates |
| Polyol B (ESO based) | Transesterified in after aromatic polyol synthesis | Polyol 14 | Clear, single phase |
| ESO/DEG | ESO/DEG generated and transesterified in during aromatic polyol synthesis | Polyol 26 | Clear, single phase |
| ESO/MeOH | Transesterified in during aromatic polyol synthesis | Polyol 23 | Clear, single phase | formulation to give the required index. 300 g total of isocyanate and B-side resin were combined and agitated for 6 seconds using a motor-driven mixing blade rotating at 3400 rpm, and the mixture was poured into a tared paper cup with volume of about 5 L. The reactivity including cream time, string gel time, firm gel time and tack free time were obtained.

Green strength and compressive strength of the foams were tested. Following the foaming method described previously, foam above the top edge of the cup was cut off at 3.5 min after the agitation and a smooth surface was obtained. Green strength of the foam was measured on this surface at 4, 5, 6, 8, 10, 12, and 15 min using an Instron 2200 instrument by controlling the indentation at 0.35 in the foam. The force needed to produce that indentation was measured and recorded. Density in lb./cu. ft. (pcf) was obtained after the green strength measurements. Compressive strength of the foam was measured using the Instron after the foam cured for at least 24 hours.

Molded foam tests: Other physical properties were obtained from the foam made in a 25 inch×15 inch×3 inch mold at 130° F. Panel foams were cured at 94° C. in an oven for 24 hours and then were cut for hotplate tests and thermal insulation properties. The panel foam was made in the same way as cup foam; about 650 g total isocyanate and B-side resin were mixed for 6 seconds and poured into the mold.

Example 6

Effect of Transesterified Oil Polyol Vs. Blended Oil Polyol on Foam Properties

In this Example, foams made from natural oil containing polyols that were prepared by transesterification of the oil into the polyester were compared against foams made by blending natural oils into an aromatic polyester polyol containing no oil. The aromatic polyester polyol containing no oil that was used in this Example was Polyol 21. Polyol 21 was blended with Polyol 22, an ESO-MeOH polyol; with castor oil; and with Polyol B, a commercially available polyol based on ring opened epoxidized soybean oil. The transesterified polyols used were Polyol 17, Polyol 12 and Polyol 14. Polyol 19, with a transesterified non-functional oil, is included for comparison. In order to compare the foam properties at the same isocyanate/hydroxyl index, a small amount of DEG was added to the blended polyols to adjust the hydroxyl value to nominal 235 mg KOH/g.

Table 7 gives results of the comparisons.

terified examples (Foams 1, 3, and 5). This indicates a lower inherent reactivity of the blended oils relative to the transesterified oils. Also, the blowing efficiency is reduced in the blended oils compared to the transesterified oils, as indicated by the higher density foams obtained when using the blended oils. This is in spite of the fact that the relative blowing agent levels used in the foam mix (Total blown, Table 7), were slightly higher for the blended oils. This is disadvantageous since material usage and hence cost per unit of volume increase when using the blended oils.

The B-side or resin blend viscosity is substantially higher in the blended examples compared with the transesterified examples at similar hydroxyl values. High B-side viscosity can result in processing difficulty as well as increased energy expenditure and cost, thus a lower viscosity is desirable.

As can also be seen from Table 7, the compressive strengths of the transesterified examples are all superior to the comparable blended examples.

The foams from this Example 6 were evaluated for thermal stability in a hot plate test. Thermal resistance by means of hotplate testing was determined on 4×4×1.2 inch cut foam blocks. The foam was placed on the hotplate at a temperature of 1200° F. and allowed to remain for 15 min. During that

TABLE 7

|  | Polyol OHv | Foam 1 25% ESO, transesterified | Foam 2 25ESO-MeOH/ No oil Blend | Foam 3 25% CO, transesterified | Foam 4 25CO/No Oil blend | Foam 5 25% polyol B, transesterified | Foam 6 25 Polyol B/No Oil Blend | Foam 7 25% SBO, transesterified |
|---|---|---|---|---|---|---|---|---|
| Polyol 17 | 246 | 100 | | | | | | |
| Polyol 19 | 235 | | | | | | | 100 |
| Polyol 12 | 243 | | | 100 | | | | |
| Polyol 14 | 227 | | | | | 100 | | |
| Polyol 21 | 242 | | 75 | | 75 | | 75 | |
| DEG | 1058 | | 1.5 | | 1 | | 1 | |
| Polyol B | 170 | | | | | | 25 | |
| Castor Oil | 170 | | | | 25 | | | |
| Polyol 22 | 146 | | 25 | | | | | |
| Fyrol ® CEF | | 10.00 | 10.00 | 10.00 | 10.00 | 10.00 | 10.00 | 10.00 |
| Polycat 5 (PMDTA) catalyst | | 0.20 | 0.18 | 0.20 | 0.20 | 0.23 | 0.20 | 0.22 |
| Dabco K-15 catalyst | | 3.02 | 3.30 | 3.30 | 3.83 | 3.30 | 3.70 | 2.70 |
| Tegostab B-8513 | | 2.00 | 2.00 | 2.00 | 2.00 | 2.00 | 2.00 | 2.00 |
| Water | | 0.50 | 0.50 | 0.50 | 0.50 | 0.50 | 0.50 | 0.50 |
| n-pentane | | 23.02 | 24.00 | 21.30 | 23.10 | 20.50 | 23.50 | 22.70 |
| Index | | 250 | 250 | 250 | 250 | 250 | 250 | 250 |
| MONDUR ® 489 | | 175.45 | 169.47 | 174.38 | 170.70 | 164.72 | 170.36 | 167.95 |
| Total blown | | 8.31% | 8.73% | 7.83% | 8.50% | 7.83% | 8.55% | 8.43% |
| Reactivity | | | | | | | | |
| Cream, s | | 14 | 13 | 11 | 13 | 12 | 13 | 13 |
| String gel, s | | 37 | 35 | 36 | 36 | 34 | 34 | 36 |
| Firm, s | | 47 | 50 | 41 | 46 | 40 | 46 | 41 |
| Tack free, s | | 56 | 60 | 56 | 63 | 59 | 56 | 61 |
| Density (pcf) | | 1.68 | 1.80 | 1.72 | 1.82 | 1.66 | 1.81 | 1.72 |
| B-side viscosity, cps @ 25 C. | | 2050 | 36500 | 800 | 14800 | 1100 | 11800 | 300 |
| Compressive strength normalized to 1.68 pcf, lbs force | | 40.42 | 34.07 | 42.75 | 38.73 | 42.09 | 31.89 | 34.22 |

In comparing run against run it is necessary to choose a model for the blended ESO example. During the preparation of the transesterified ESO, the epoxide groups ring open with the hydroxyl groups of the DEG to give one OH functionality per epoxide group. The ESO polyol that had been ring opened with methanol has one OH group per original epoxide group as well, and was chosen as the model compound for the blended example. Polyol B has the epoxide rings already ring opened and was used in both transesterification and blending. It is apparent from the data in Table 7 that in order to achieve similar reactivity, more foaming catalyst is needed in the blended examples (Foams 2, 4 and 6) relative to the transestime, the programmed temperature was gradually decreased from 1200° F. to 1000° F. The measures of thermal stability were the relative weight loss and thickness change of the sample specimen. Volume expansion of the foam under thermal stress is preferable and less weight loss is presumed to indicate better thermal stability. The hotplate performance (thermal stability) is superior in the transesterified examples (Foams 1, 3, 5) relative to the blended examples (Foams 2, 4, 6) as illustrated in FIG. 1 and Table 8. In each case, the foams made with blended oil polyols had higher weight loss and less thickness retention than the foams made with transesterified oils.

TABLE 8

| foam example # | polyol example # | oil type | oil amount | incorporation method | initial thickness, inches | final thickness, inches | initial weight, g | final weight, g | avg weight change % | avg thickness change % |
|---|---|---|---|---|---|---|---|---|---|---|
| Foam 1 | Polyol 17 | ESO | 25 | transesterified | 1.21 | 1.54 | 9.86 | 7.08 | −27% | 31% |
| Foam 2 | Polyol 22 + Polyol 21 | ESO/MeOH | 25 | blended | 1.23 | 0.79 | 8.34 | 5.27 | −37.7% | −36.5% |
| Foam 3 | Polyol 12 | Castor oil | 25 | transesterified | 1.22 | 1.65 | 8.90 | 6.51 | −26.2% | 36.4% |
| Foam 4 | CO + Polyol 21 | Castor oil | 25 | blended | 1.24 | 1.40 | 8.58 | 5.84 | −31.0% | 12.2% |
| Foam 5 | Polyol 14 | Polyol B | 25 | transesterified | 1.23 | 1.60 | 8.43 | 6.11 | −26.7% | 30.8% |
| Foam 6 | Polyol 3 + Polyol 21 | Polyol B | 25 | blended | 1.24 | 0.80 | 8.08 | 5.09 | −37.2% | −32.1% |

Example 7

Effect of Functionalized Oils Vs. Non-Functionalized Oils on Foam Properties Blending of natural oil polyols into aromatic polyester polyols as a means of introducing renewable content into polyols for use in polyurethane resin and polyisocyanurate resin foams has been shown to produce unstable polyol mixtures which separate on storage. If the approach of transesterifying natural oil based materials into the aromatic polyester polyol to gain phase stability is considered, two major classes of materials that are conceivable are unmodified natural oils, with no hydroxyl functionality, and functionalized oils, i.e., natural oil polyols. In this Example, aromatic polyester polyols transesterified with functionalized natural oils and aromatic polyester polyols transesterified with non-functionalized oils are used to prepare foams. Properties of the foams are compared to determine the effect of the use of functionalized oils on foam properties relative to the use of non-functionalized oils. The formulations used to make foams from transesterified natural oil polyols and from transesterified non-functional oils, and the resulting reactivities and compressive strengths are shown in Table 9.

TABLE 9

| | | Foam 8 | Foam 9 | Foam 10 | Foam 11 | Foam 12 | Foam 13 | Foam 14 | Foam 15 | Foam 16 |
|---|---|---|---|---|---|---|---|---|---|---|
| | | 15SBO | 15CO | 15ESO | 25SBO | 25CO | 25ESO | 25ESO-MeOH | 35CO | No Oil |
| Polyol | OHv | | | | | | | | | |
| 20 | 245 | 100 | | | | | | | | |
| 13 | 234 | | 100 | | | | | | | |
| 18 | 242 | | | 100 | | | | | | |
| 19 | 235 | | | | 100 | | | | | |
| 12 | 243 | | | | | 100 | | | | |
| 17 | 246 | | | | | | 100 | | | |
| 23 | 239 | | | | | | | 100 | | |
| 24 | 242 | | | | | | | | 100 | |
| 21 | 242 | | | | | | | | | 100 |
| Fyrol ® CEF | | 10 | 10 | 10 | 10 | 10 | 10 | 10 | 10 | 10 |
| Polycat 5 (PMDTA) | | 0.2 | 0.2 | 0.2 | 0.2 | 0.2 | 0.2 | 0.2 | 0.2 | 0.2 |
| Dabco K-15 | | 3.3 | 3.3 | 3.3 | 3.3 | 3.3 | 3.3 | 3.3 | 3.3 | 3.3 |
| Tegostab B-8513 | | 2 | 2 | 2 | 2 | 2 | 2 | 2 | 2 | 2 |
| Water | | 0.5 | 0.5 | 0.5 | 0.5 | 0.5 | 0.5 | 0.5 | 0.5 | 0.5 |
| n-pentane | | 21.5 | 21 | 21.4 | 21.05 | 21.3 | 21.6 | 21.2 | 21.4 | 21.4 |
| Index | | 250 | 250 | 250 | 250 | 250 | 250 | 250 | 250 | 250 |
| MONDUR ® 489 | | 175.6 | 168.9 | 173.8 | 169.5 | 174.4 | 176.2 | 172.0 | 173.8 | 173.8 |
| Reactivity: | | | | | | | | | | |
| Cream | | 14 | 10 | 11 | 12 | 11 | 11 | 11 | 12 | 11 |
| String gel | | 36 | 28 | 30 | 29 | 36 | 32 | 31 | 36 | 30 |
| Firm | | 42 | 34 | 36 | 32 | 41 | 41 | 40 | 41 | 36 |
| Tack free | | 58 | 39 | 49 | 43 | 56 | 47 | 50 | 67 | 40 |
| Density (pcf) | | 1.75 | 1.68 | 1.76 | 1.8 | 1.72 | 1.79 | 1.75 | 1.75 | 1.74 |
| Compressive strength normalized to 1.68 pcf, lbs force | | 39.95 | 45.56 | 42.97 | 35.24 | 42.75 | 40.86 | 44.58 | 39.49 | 49.89 |

Figure 2:
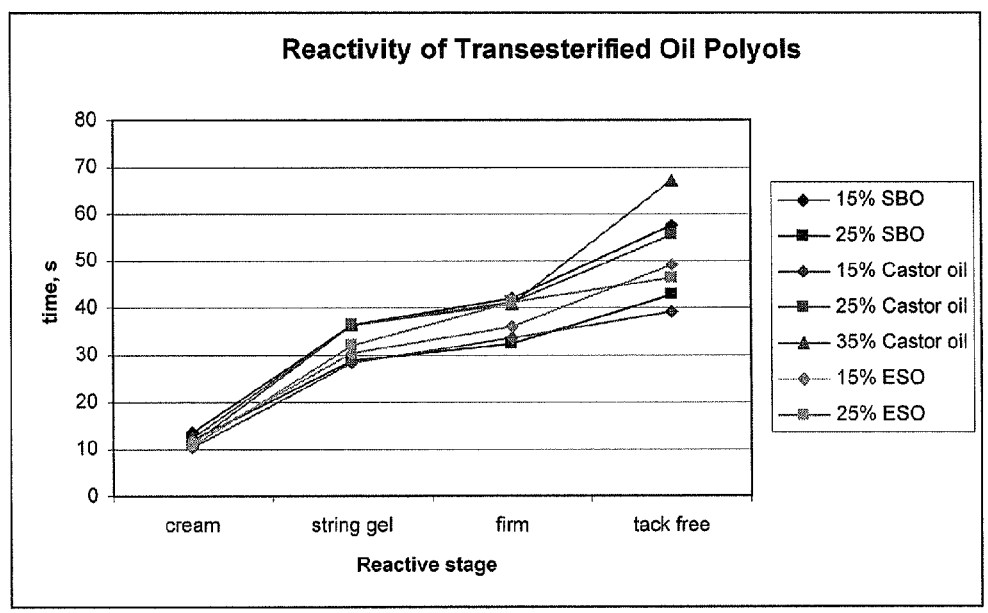
FIG. 2 shows the reactivity profile for the preparation of select foams made using transesterified natural oil polyols.

The formulations listed in Table 9 had the same catalyst levels to study how the reactivity and properties of the foam compositions and resultant foams were affected by the natural oil polyols. Typically the string gel time is taken as an index of relative reactivity. As can be seen from the table and from the graph in FIG. 2, there is no clear trend in the reactivity data as to the effect of the presence or absence of oil functionality on reactivity.

Figure 3:
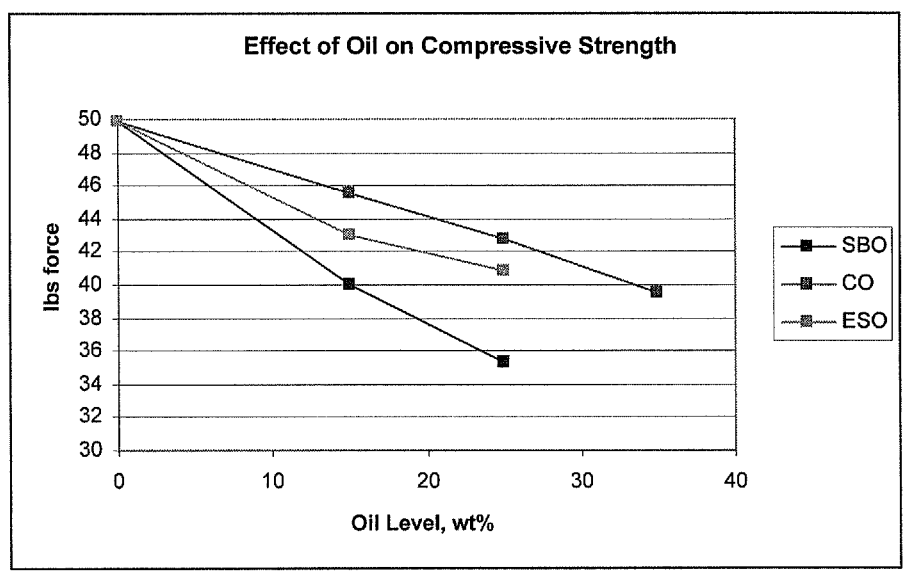
FIG. 3 shows the effect of oil type and level on compressive strength.

However, it is apparent from the data in Table 9 and FIG. 3 that the compressive strengths are improved by the use of functionalized oils (Foams 9, 10, 12, 13, 14 and 15) relative to nonfunctional oils (Foams 8 and 11) at the same foaming catalyst usage rates.

Figure 4:
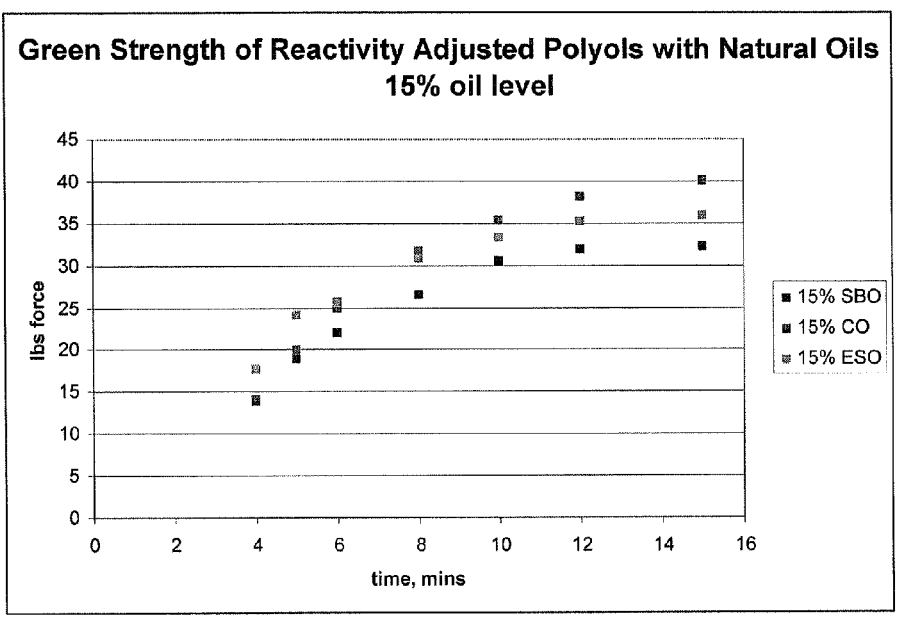
FIG. 4 shows the green strength of foams made using reactivity adjusted polyols having 15% natural oil.
Figure 5:
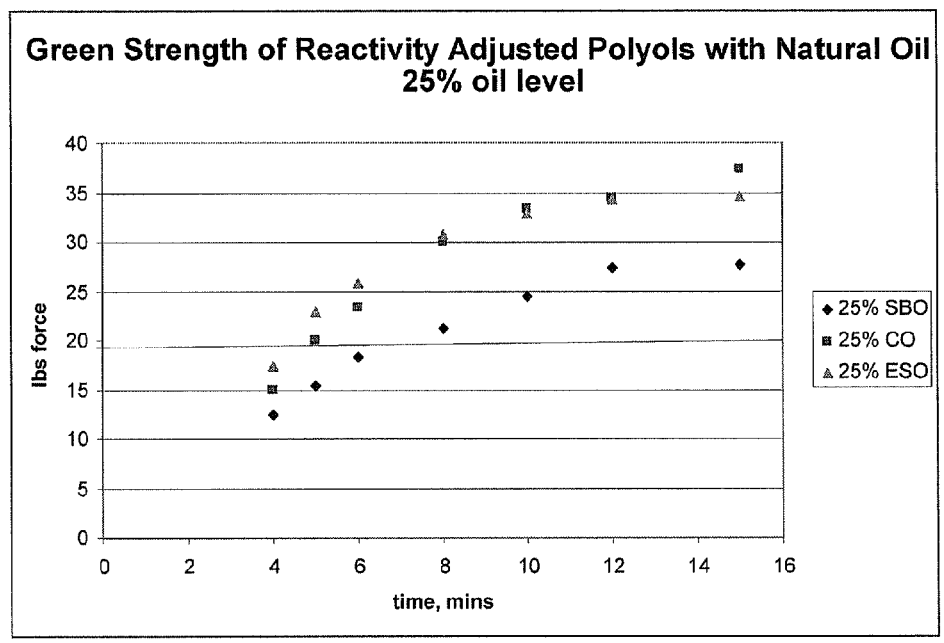
FIG. 5 shows the green strength of foams made using reactivity adjusted polyols having 25% natural oil.
Figure 6:
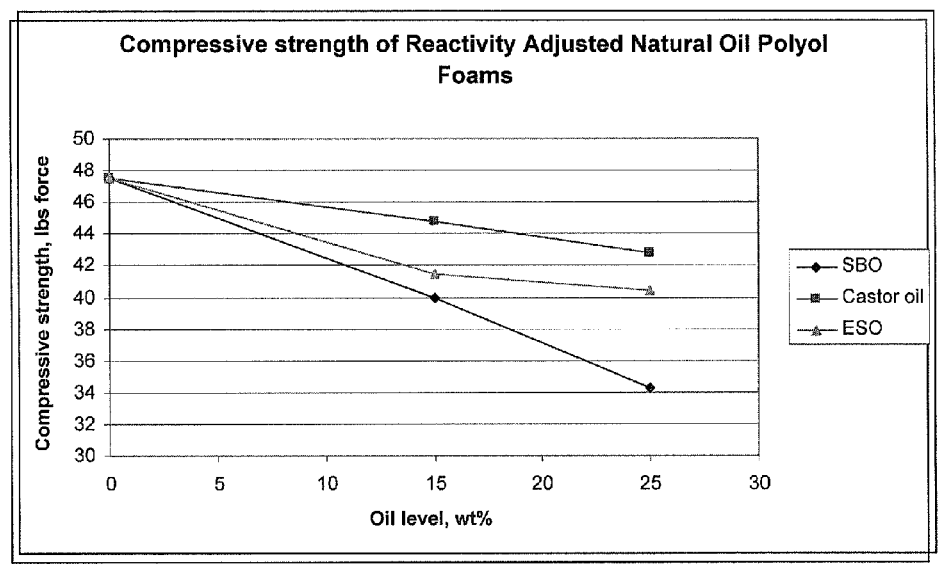
FIG. 6 shows the compressive strength of reactivity adjusted foams having natural oil content.

The foam formulations of Table 9 were modified by adjusting the catalyst and blowing agent levels so that the formulations gave similar reactivities and densities as shown in Table 10. The data in the table, and FIGS. 4 and 5, show that the use of functionalized oils resulted in improved green strengths compared to the use of non-functionalized oils at comparable oil levels. It is also evident from the data in Table 10 and FIG. 6 that the foams prepared from the functionalized oils had better compressive strengths than the foams prepared from non-functionalized oils, at comparable oil levels.

Green strength can be considered as a sort of time-dependent compressive strength, and is an important consideration in the preparation of rigid foam panels. Poor green strength can lead to excessive post growth and non-uniformities in the finished laminate board. The compressive strength of a fully cured foam is an important property because it is a determinant of the foam's ability to support weight and still maintain its integrity and insulating value.

Figure 7:
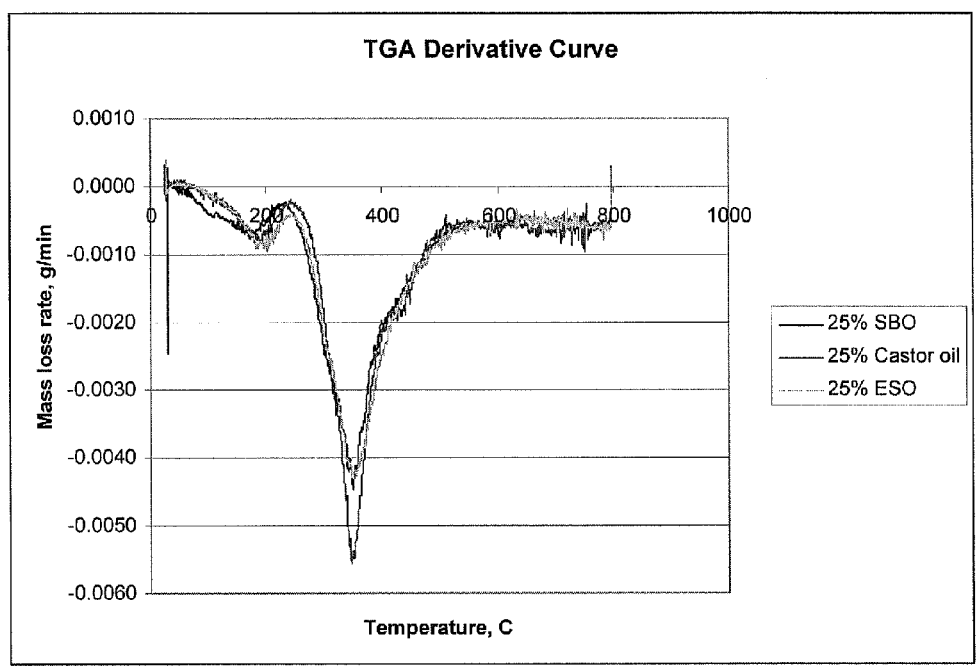
FIG. 7 shows a mass loss derivative plot illustrating the two main mass loss regimes and the later onset of mass loss of foams made using polyols with functionalized oils.

The foams prepared from functionalized oils also exhibit superior thermal stability relative to the foams prepared with nonfunctional oils as determined by thermal gravimetric analysis (TGA). Table 11 shows the onset temperatures and peak mass loss rate temperatures as a function of oil type and level. FIG. 7 shows a mass loss derivative plot that illustrates the two main mass loss regimes and the later onset of mass loss of foams with functionalized oils. These data demonstrate that the foams prepared with non-functional SBO have earlier onset of mass loss than foams prepared from functionalized oils in the two primary mass loss regimes exhibited in the TGA. This indicates superior thermal stability of the foams prepared from functionalized oils.

TABLE 11

| Polyol Example # | Foam Example # | Oil type and amount | TGA Temperatures (° C.) | | | |
|---|---|---|---|---|---|---|
| | | | onset 1 | onset 2 | peak 1 | peak 2 |
| 12 | Foam 12 | 25CO | 139.0 | 310.8 | 181.9 | 348.8 |
| 13 | Foam 9 | 15CO | 130.0 | 313.6 | 185.5 | 349.3 |
| 24 | Foam 24 | 35CO | 135.3 | 303.2 | 176.3 | 353.0 |
| 17 | Foam 21 | 25ESO | 150.7 | 304.2 | 186.1 | 351.4 |
| 18 | Foam 18 | 15ESO | 141.1 | 311.1 | 183.8 | 354.8 |
| 19 | Foam 20 | 25SBO | 106.4 | 296.9 | 160.2 | 347.9 |
| 20 | Foam 17 | 15SBO | 130.4 | 297.0 | 163.4 | 342.4 |
| 21 | Foam 23 | No Oil | 170.5 | 314.8 | 227.1 | 342.5 |

TABLE 10

| | | Foam 17 | Foam 18 | Foam 19 | Foam 20 | Foam 21 | Foam 22 | Foam 23 |
|---|---|---|---|---|---|---|---|---|
| Polyol | OHv | 15SBO | 15ESO | 15CO | 25SBO | 25ESO | 25CO | NO Oil |
| 20 | 245 | 100 | | | | | | |
| 18 | 242 | | 100 | | | | | |
| 13 | 234 | | | 100 | | | | |
| 19 | 235 | | | | 100 | | | |
| 17 | 246 | | | | | 100 | | |
| 12 | 243 | | | | | | 100 | |
| 21 | 242 | | | | | | | 100 |
| Fyrol ® CEF | | 10 | 10 | 10 | 10 | 10 | 10 | 10 |
| Polycat 5 (PMDTA) | | 0.2 | 0.17 | 0.15 | 0.16 | 0.18 | 0.2 | 0.16 |
| Dabco K-15 | | 3.3 | 2.86 | 2.46 | 2.7 | 3.02 | 3.3 | 2.7 |
| Tegostab B-8513 | | 2 | 2 | 2 | 2 | 2 | 2 | 2 |
| Water | | 0.5 | 0.5 | 0.5 | 0.5 | 0.5 | 0.5 | 0.5 |
| n-pentane | | 22.5 | 22.5 | 20.7 | 22.7 | 23.2 | 21.3 | 22.1 |
| Index | | 250 | 250 | 250 | 250 | 250 | 250 | 250 |
| MONDUR ® 489 | | 175.6 | 172.6 | 166.7 | 168.0 | 175.4 | 174.4 | 172.2 |
| Polycat 5% in foam mix | | 0.06% | 0.05% | 0.05% | 0.05% | 0.06% | 0.06% | 0.05% |
| Dabco K-15 % in foam mix | | 1.05% | 0.92% | 0.81% | 0.88% | 0.96% | 1.06% | 0.87% |
| total blown | | 8.15% | 8.24% | 7.87% | 8.43% | 8.37% | 7.83% | 8.14% |
| Reactivity: | | | | | | | | |
| Cream | | 14 | 13 | 12 | 13 | 14 | 11 | 14 |
| String gel | | 36 | 35 | 34 | 36 | 37 | 36 | 35 |
| Firm | | 41 | 44 | 41 | 41 | 47 | 41 | 42 |
| Tack free | | 52 | 62 | 58 | 61 | 56 | 56 | 63 |
| Density (pcf) | | 1.69 | 1.68 | 1.69 | 1.72 | 1.68 | 1.72 | 1.68 |
| | time, min | | | | | | | |
| Green Strength (lb force) | 4 | 13.98 | 17.69 | 13.76 | 12.41 | 17.39 | 14.91 | 18.82 |
| | 5 | 18.85 | 24.11 | 19.99 | 15.38 | 22.89 | 20.00 | 25.86 |
| | 6 | 22.05 | 25.68 | 24.99 | 18.29 | 25.77 | 23.43 | 30.35 |
| | 8 | 26.41 | 30.81 | 31.60 | 21.17 | 30.71 | 30.05 | 36.50 |
| | 10 | 30.51 | 33.19 | 35.27 | 24.53 | 32.94 | 33.42 | 38.39 |
| | 12 | 31.76 | 35.13 | 38.02 | 27.34 | 34.34 | 34.39 | 41.43 |
| | 15 | 32.17 | 35.75 | 40.00 | 27.70 | 34.58 | 37.39 | 42.41 |
| Compressive strength normalized to 1.68 pcf, lbs force | | 39.94 | 41.51 | 44.81 | 34.22 | 40.42 | 42.75 | 47.52 |

Example 8

Effect of Functionalized Vs. Non-Functionalized Natural Oils on Thermal Resistance This Example demonstrates the effect of using functional vs. non-functional natural oils on the long term thermal resistance (LTTR) of foams prepared with natural oils.

Table 11 and FIG. 12 show that foams made with polyols that contain functionalized oils maintain their long term insulating ability better than foams prepared with polyols containing non-functionalized oils. This is advantageous because the foam's primary purpose is to provide insulation. If a foam's insulating ability declines during its useful life, then higher energy costs and greater greenhouse gas emissions can result. For example, if an insulating material in a building with initial R-value=318 C*sq meter*hr/MJ loses 18% of its insulating ability compared against one that loses 16% of its insulating ability in an environment with a 10° C. delta T, at least 5.5 MJ/sq. meter per year in additional energy is lost and at least 1128 additional g $CO_2$/sq meter per year are produced due to having to burn fossil fuels to replace this lost energy. Thus a material that has a slower decrease in R-value is preferred over a material that loses its R-value faster.

TABLE 12

| Oil Type | Oil Level, wt % | Initial R value/inch | 2" LTTR R-value/inch | % Change |
|---|---|---|---|---|
| N/A | 0 | 6.571 | 5.77 | −12% |
| SBO | 15 | 6.453 | 5.45 | −16% |
| SBO | 25 | 6.530 | 5.37 | −18% |
| Castor oil | 15 | 6.492 | 5.57 | −14% |
| Castor oil | 25 | 6.572 | 5.51 | −16% |
| ESO | 15 | 6.501 | 5.59 | −14% |
| ESO | 25 | 6.408 | 5.40 | −16% |

Example 9

Effect of Functionalized Oil Vs. Non-Functionalized Oil on n-Pentane Compatibility This Example demonstrates the effect that a functionalized natural oil has on n-pentane compatibility compared to a non-functionalized natural oil in aromatic polyester/natural oil polyols used for the preparation of n-pentane-blown rigid polyisocyanurate foams. Compatibility of the n-pentane blowing agent is important for stability of the B-side. It is also important for optimal processing of the foam, such that better n-pentane compatibility provides a competitive advantage.

n-Pentane compatibility is measured by adding n-pentane into 40 g of the aromatic polyester polyol in increments of 0.4 g (1 part based on polyol 100 parts), then stirring and observing the clearness of the blend. The total amount of n-pentane added into the polyol before the blend becomes a white opaque emulsion is recorded as the maximum n-pentane compatibility.

Figure 9:
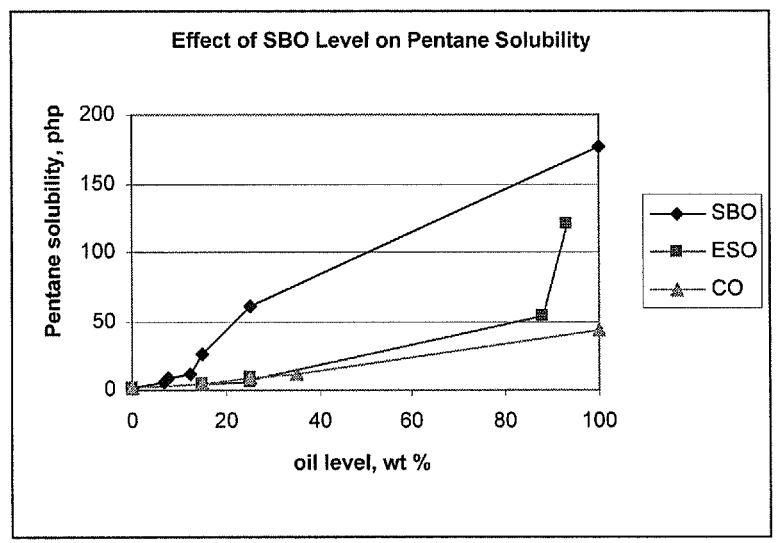
FIG. 9 shows the effect on pentane solubility of adding transesterified functional and non-functional oils to an aromatic polyester polyol.

Table 13 and FIG. 9 show that, surprisingly, the n-pentane compatibility with the polyol is strongly dependent on the oil type, with non-functional SBO showing the best n-pentane compatibility relative to the functionalized oils CO and ESO. This trend is seen with both the pure oils and the transesterified oils, with the polyols that contain more oil showing better n-pentane compatibility.

Figure 10:
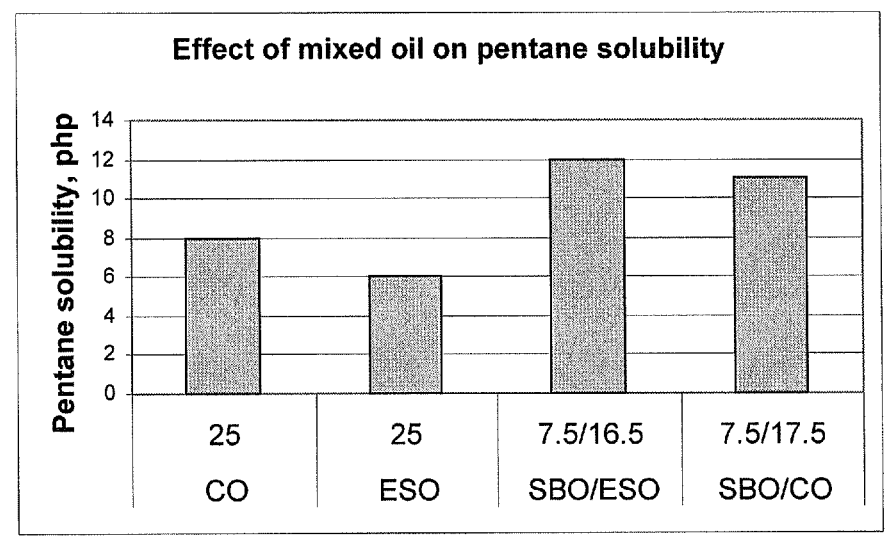
FIG. 10 shows the effect on pentane solubility of adding a non-functional oil (soybean oil) to a functional oil containing aromatic polyester polyol.
Figure 11:
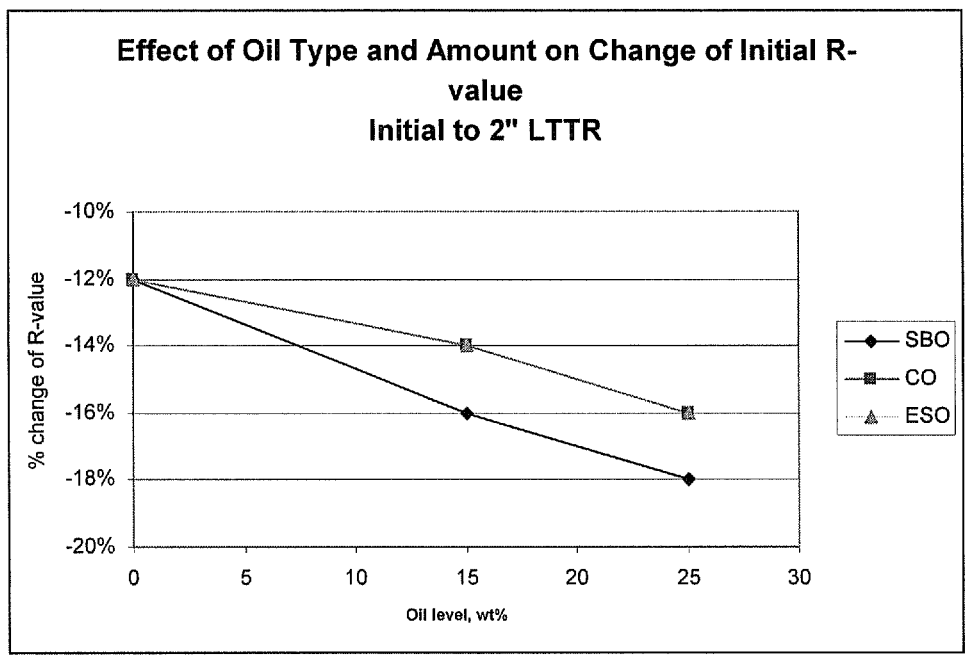
FIG. 11 shows the long term insulating ability of foams made using polyols containing different oil types and amounts.

Table 13 and FIG. 10 also show that n-pentane compatibility in functional oil containing polyols can be improved by including some non-functional oil (compare Polyol 23 and Polyol 16; Polyol 12 and Polyol 27). The combination of the functional and non-functional oils provides a competitive advantage over polyols that contain solely one or the other types of oil since the functional oil provides improved foam properties while the non-functional oil provides improved n-pentane compatibility. Thus, optimal product performance can be achieved by combining the functional and non-functional oils.

TABLE 13

| Polyol | Oil type | Oil level | n-Pentane compatibility, php |
|---|---|---|---|
| 21 | None | 0 | 2 |
|  | SBO | 6.75 | 6 |
| Polyol A | SBO | 8.3 | 9 |
|  | SBO | 12.2 | 12 |
| 20 | SBO | 15 | 26 |
| 19 | SBO | 25 | 61 |
| N/A | SBO | 100 | >177 |
| 18 | ESO | 15 | 4 |
| 17 | ESO | 25 | 6 |
| 14 | ESO | 25 | 9 |
| 23 | ESO/MeOH | 25 | 7 |
| 22 | ESO/MeOH | 88 | 53 |
| Polyol B | ESO | 93.2 | >121 |
| 13 | CO | 15 | 5 |
| 12 | CO | 25 | 8 |
| 24 | CO | 35 | 12 |
| N/A | CO | 100 | 44 |
| 16 | SBO/ESO | 7.5/16.5 | 12 |
| 27 | SBO/CO | 7.5/17.5 | 11 |

TABLE 14

| Foam Formulation | Polyol OHv | Foam 31 7.5SBO + 16.5ESO | Foam 1 25% ESO, transesterified | Foam 2 25ESO-MeOH/No oil Blend |
|---|---|---|---|---|
| Polyol 16 | 236 | 100 |  |  |
| Polyol 17 | 246 |  | 100 |  |
| Polyol 21 | 242 |  |  | 75 |
| Diethylene glycol | 1058 |  |  | 1.5 |
| Polyol 22 | 146 |  |  | 25 |
| Fyrol ® CEF |  | 10.00 | 10.00 | 10.00 |
| Polycat 5 (PMDTA) catalyst |  | 0.19 | 0.18 | 0.20 |
| Dabco K-15 catalyst |  | 3.14 | 3.02 | 3.30 |
| Tegostab B-8513 |  | 2.00 | 2.00 | 2.00 |
| Water |  | 0.50 | 0.50 | 0.50 |
| n-pentane |  | 21.30 | 23.02 | 24.00 |
| B-side viscosity (cP @25 C.) |  | 1,038 | 2,050 | 36,500 |
| Index |  | 250 | 250 | 250 |
| MONDUR ® 489 |  | 169.73 | 175.45 | 169.47 |
| Total blown: |  | 7.95% | 8.31% | 8.73% |
| Cream, s |  | 12 | 14 | 13 |
| String gel, s |  | 34 | 37 | 35 |
| Firm, s |  | 40 | 47 | 50 |
| Tack free, s |  | 55 | 56 | 60 |
| Density (pcf) |  | 1.69 | 1.68 | 1.80 |
| Compressive strength normalized to 1.68 pcf, lbs force |  | 39.80 | 40.42 | 34.07 |
| Polyol appearance/stability |  | Clear, stable | Clear, stable | Opaque, separates |
| Polyol n-pentane compatibility limit, parts |  | 12 | 6 | Opaque at 0 parts |

Liquid and foam properties are compared in Table 14 for polyols with a combination of functional and non-functional transesterified oil, functional oil alone transesterified, and functional oil blended into the aromatic polyester polyol. The combination polyol gives approximately the same compressive strength as functional oil alone, and greater than blended oil. It also provides greater pentane compatibility than functional oil alone, and the polyol blend is stable, in contrast to the blended polyol. Thus, optimal product performance may be achieved by combining the functional and non-functional oils.

Example 10

Effects of Nonionic Surfactant Addition

It has been found that the use of nonionic surfactants in aromatic polyester polyols containing transesterified natural oils improves reactivity properties in the foam-forming process when compared against foams prepared with transesterified natural oil containing aromatic polyester polyols and no nonionic surfactant.

The formulations used to determine the effect of surfactant on B side and foam properties prepared from transesterified natural oil polyols are shown in Table 15.

TABLE 15

|  | OHv | Foam 25 | Foam 11 | Foam 26 | Foam 13 | Foam 27 | Foam 12 |
|---|---|---|---|---|---|---|---|
| Polyol |  | 25% SBO | 25% SBO with surfactant | 25% ESO | 25% ESO with surfactant | 25% CO | 25% CO with surfactant |
| 29 | 234 | 100 |  |  |  |  |  |
| 19 | 235 |  | 100 |  |  |  |  |
| 26 | 235 |  |  | 100 |  |  |  |
| 17 | 246 |  |  |  | 100 |  |  |
| 28 | 240 |  |  |  |  | 100 |  |
| 12 | 243 |  |  |  |  |  | 100 |
| Fyrol ® CEF |  | 10 | 10 | 10 | 10 | 10 | 10 |
| Polycat 5 (PMDTA) |  | 0.2 | 0.2 | 0.2 | 0.2 | 0.2 | 0.2 |
| Dabco K-15 % |  | 3.3 | 3.3 | 3.3 | 3.3 | 3.3 | 3.3 |
| Tegostab B-8513 |  | 2 | 2 | 2 | 2 | 2 | 2 |
| Water |  | 0.5 | 0.5 | 0.5 | 0.5 | 0.5 | 0.5 |
| n-pentane |  | 21 | 21.05 | 21 | 21.6 | 21.3 | 21 |
| Index |  | 250 | 250 | 250 | 250 | 250 | 250 |
| MONDUR ® 489 |  | 168.9 | 169.5 | 169.5 | 176.2 | 172.6 | 174.4 |
| Polycat 5% in foam mix |  | 0.07% | 0.07% | 0.07% | 0.06% | 0.06% | 0.06% |
| Dabco K-15 % in foam mix |  | 1.08% | 1.08% | 1.08% | 1.05% | 1.06% | 1.06% |
| total blown: |  | 7.88% | 7.88% | 7.86% | 7.87% | 7.87% | 7.74% |
| Reactivity: |  |  |  |  |  |  |  |
| Cream |  | 19 | 12 | 21 | 11 | 17 | 11 |
| String gel |  | 43 | 29 | 57 | 32 | 47 | 36 |
| Firm |  | 51 | 32 | 86 | 41 | 57 | 41 |
| Tack free |  | 63 | 43 | 96 | 47 | 67 | 56 |
| Density (pcf) |  | 1.84 | 1.8 | 1.81 | 1.79 | 1.78 | 1.72 |
| Compressive strength normalized to 1.68 pcf, lbs force | (lbs force) | 35.5 | 35.2 | 41.1 | 40.9 | 42.8 | 42.7 |
| B-side viscosity, cps @ 25 C. |  | 325 | 320 | 3200 | 2000 | 1100 | 800 |

Figure 8:
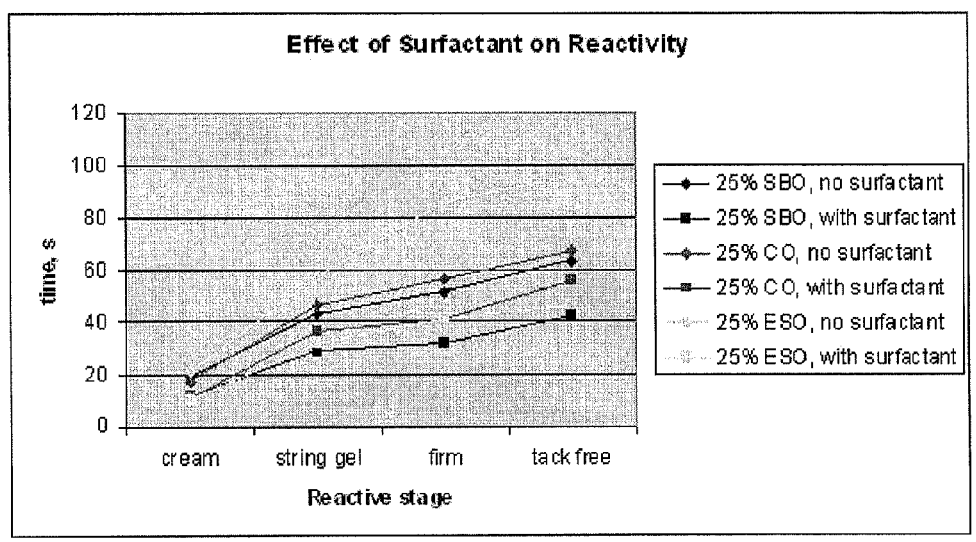
FIG. 8 shows the effect of surfactant on the reactivity profile of foams prepared from transesterified natural oil polyols.

Table 15 and FIG. 8 show that, at equal foaming catalyst levels, an improved reactivity profile is obtained with the use of a nonionic surfactant. The surfactant also lowers the B-side viscosity, which is advantageous due to lower energy consumption and better mixing of the A side and B side during foaming. Nonionic surfactants also have the potential to improve compatibility of hydrocarbon blowing agents in the B component, as shown in U.S. Pat. No. 5,922,779, incorporated herein by reference.

In Table 16 foaming catalyst levels in the formulations of Table 14 have been adjusted to give similar reactivity (as determined by the string gel times). Substantially more catalyst is required to achieve similar reactivity for the formulations without the nonionic surfactant.

TABLE 16

|  | OHv | Foam 28 | Foam 20 | Foam 29 | Foam 21 | Foam 30 | Foam 12 |
|---|---|---|---|---|---|---|---|
| Polyol |  | 25% SBO | 25% SBO with surfactant | 25% ESO | 25% ESO with surfactant | 25% CO | 25% CO with surfactant |
| 29 | 234 | 100 |  |  |  |  |  |
| 19 | 235 |  | 100 |  |  |  |  |
| 26 | 235 |  |  | 100 |  |  |  |

TABLE 16-continued

|  | OHv | Foam 28 | Foam 20 | Foam 29 | Foam 21 | Foam 30 | Foam 12 |
|---|---|---|---|---|---|---|---|
| 17 | 246 |  |  |  | 100 |  |  |
| 28 | 240 |  |  |  |  | 100 |  |
| 12 | 243 |  |  |  |  |  | 100 |
| Fyrol ® CEF |  | 10 | 10 | 10 | 10 | 10 | 10 |
| Polycat 5 (PMDTA) |  | 0.25 | 0.16 | 0.3 | 0.18 | 0.27 | 0.2 |
| Dabco K-15 |  | 4 | 2.7 | 4.86 | 3.02 | 4.43 | 3.3 |
| Tegostab B-8513 |  | 2 | 2 | 2 | 2 | 2 | 2 |
| water |  | 0.5 | 0.5 | 0.5 | 0.5 | 0.5 | 0.5 |
| n-pentane |  | 21.3 | 22.1 | 20.4 | 23.2 | 21 | 21.3 |
| OH total equivalents |  | 0.5 | 0.5 | 0.5 | 0.5 | 0.5 | 0.5 |
|  |  | 250 | 250 | 250 | 250 | 250 | 250 |
| MONDUR ® 489 |  | 170.8 | 168.0 | 173.7 | 175.4 | 175.6 | 174.4 |
| Polycat 5% in foam mix |  | 0.08% | 0.05% | 0.10% | 0.06% | 0.09% | 0.06% |
| Dabco K-15 % in foam mix |  | 1.30% | 0.88% | 1.56% | 0.96% | 1.41% | 1.06% |
| total blown: |  | 7.90% | 8.25% | 7.54% | 8.37% | 7.68% | 7.83% |
| Reactivity: |  |  |  |  |  |  |  |
| Cream |  | 13 | 13 | 12 | 14 | 12 | 11 |
| String gel |  | 33 | 36 | 35 | 37 | 32 | 36 |
| Firm |  | 37 | 41 | 49 | 47 | 38 | 41 |
| Tack free |  | 58 | 61 | 56 | 56 | 61 | 56 |
| Density (pcf) |  | 1.72 | 1.72 | 1.74 | 1.68 | 1.73 | 1.72 |
| Green Strength (lb force) | time, min |  |  |  |  |  |  |
|  | 4 | 13.42 | 12.41 | 19.40 | 17.39 | 16.24 | 14.91 |
|  | 5 | 17.71 | 15.38 | 26.41 | 22.89 | 22.60 | 20.00 |
|  | 6 | 21.52 | 18.29 | 31.29 | 25.77 | 27.04 | 23.43 |
|  | 8 | 26.82 | 21.17 | 38.33 | 30.71 | 33.29 | 30.05 |
|  | 10 | 30.08 | 24.53 | 40.25 | 32.94 | 37.3 | 33.42 |
|  | 12 | 31.36 | 27.34 | 41.88 | 34.34 | 39.8 | 34.39 |
|  | 15 | 34.04 | 27.70 | 43.03 | 34.58 | 40.3 | 37.39 |

Example 11

Polyurethane Foam Formulations

Aromatic polyester polyols find use in polyurethane foam formulations, generally in combination with polyether polyols. In Table 17, polyester and polyether polyols will be combined in polyol blends, in one of which the polyester polyol incorporates functional oil transesterified, and in the other functional oil is blended at the same overall level into the combined polyol composition. Liquid compatibility properties and polyurethane foams made with the polyols are compared.

Aromatic polyester polyols with transesterified functional oils, of sufficiently high functionality, will also be used as the sole polyol in polyurethane foam formulations. A foam based on such a polyol is formulated in Table 17.

TABLE 17

| Foam Formulation | Foam PUR1 12.5% ESO, transesterified | Foam PUR2 12.5% ESO, blended | Foam PUR3 38% ESO, 3% SBO, transesterified |
|---|---|---|---|
| Polyol 26 | 50.0 |  |  |
| Polyol 25 |  | 37.5 |  |
| Polyol B |  | 12.5 |  |
| Voranol 360 | 50.0 | 50.0 |  |
| Polyol 7 |  |  | 100.0 |
| Polycat 5 | 1.3 | 1.3 | 1.3 |
| Polycat 8 | 0.5 | 0.5 | 0.5 |
| Dabco K-15 | 1.0 | 1.0 | 1.0 |
| Niax L-5440 silicone | 2.0 | 2.0 | 2.0 |
| Water | 1.5 | 1.5 | 1.5 |
| Cyclopentane | 10.0 | 10.0 | 10.0 |
| Polyol blend appearance/stability | Clear, stable | Opaque, separates | Clear, stable |
| B component appearance/stability | Clear, stable | Opaque, separates | — |
| Index (Mondur MR isocyanate) | 120 | 120 | 120 |
| Reactivity/density: |  |  |  |
| Cream time, sec | 6 | 6 | 7 |
| String gel time, sec | 24 | 25 | 26 |
| Density, pct | 1.9 | 1.9 | 1.9 |
| Foam cell structure | Fine, regular | Fine, regular | Fine, regular |

In the polyester/polyether combinations, both the polyol blend and the B component will be found to be clear and stable with the transesterified functional oil, and opaque and physically unstable with the blended functional oil. Both polyols and B components are often shipped and stored as blends, and phase stability is very desirable for these uses. When mixed with Mondur MR isocyanate at a ratio giving an index typical of polyurethanes, the formulations will produce foams of equivalent density and cell structure.

The invention and the manner and process of making and using it, are now described in such full, clear, concise and exact terms as to enable any person skilled in the art to which it pertains, to make and use the same. Although the foregoing describes preferred embodiments of the present invention, modifications may be made therein without departing from the spirit or scope of the present invention as set forth in the claims. To particularly point out and distinctly claim the subject matter regarded as invention, the following claims conclude this specification.

The invention claimed is:

1. A foam forming composition comprising at least one diisocyanate component and/or at least one polyisocyanate component; and at least one aromatic polyester polyol component comprising:
the interesterification or transesterification reaction product of:
(i) at least one aromatic acid component;
(ii) at least one hydroxylated component;
(iii) at least one functionalized natural oil component which is the reaction product of at least one epoxidized oil reacted with an active hydrogen compound; and
(iv) optionally at least one catalyst component.

2. The foam forming composition of claim 1, wherein the foam formed is a closed cell rigid polyurethane foam.

3. The foam forming composition of claim 1, wherein the foam formed is a polyisocyanurate or a urethane-modified polyisocyanurate foam.

4. The foam forming composition of claim 1, wherein the catalyst component is at least one titanate.

5. The foam forming composition of claim 1, wherein the aromatic acid component is a member selected from the group consisting of terephthalic acid, isophthalic acid, phthalic anhydride, phthalic acid, pyromellitic anhydride, dimethyl terephthalate, polyethylene terephthalate, trimellitic anhydride, and combinations thereof.

6. The foam forming composition of claim 1, wherein the hydroxylated component is a member selected from the group consisting of glycerol, trimethylolpropane, pentaerythritol, diethylene glycol, ethylene glycol, propylene glycol, dipropylene glycol, trimethylene glycol, butylene glycols, 1,2-cyclohexanediol, hexane diols, pentane diols, poly (oxyalkylene) polyols, tri-ethylene glycol, tetra-ethylene glycol, derivatives thereof, and combinations thereof.

7. The foam forming composition of claim 1, wherein the functionalized natural oil component is a member selected from the group consisting of: functionalized castor oil, functionalized coconut oil, functionalized cochin oil, functionalized corn oil, functionalized cottonseed oil, functionalized linseed oil, functionalized lesquerella oil, functionalized olive oil, functionalized palm oil, functionalized palm kernel oil, functionalized peanut oil, functionalized soybean oil, functionalized sunflower oil, functionalized tall oils, functionalized tallow, functionalized tung oil, functionalized whale oil, functionalized tea seed oil, functionalized sesame seed oil, functionalized safflower oil, functionalized rapeseed oil, functionalized fish oils, derivatives thereof, and combinations thereof.

8. The foam forming composition of claim 1, wherein the aromatic polyester polyol component further comprises at least one non-functionalized oil.

9. The foam forming composition of claim 8, wherein the non-functionalized oil is a member selected from the group consisting of coconut oil, cochin oil, corn oil, cottonseed oil, linseed oil, olive oil, palm oil, palm kernel oil, peanut oil, soybean oil, sunflower oil, tall oils, tallow, tung oil, whale oil, tea seed oil, sesame seed oil, safflower oil, rapeseed oil, fish oils, derivatives thereof, and combinations thereof.

10. The foam forming composition of claim 1, wherein the aromatic polyester polyol component further comprises at least one nonionic surfactant.

11. The foam forming composition of claim 10, wherein the nonionic surfactant is a polyoxyalkylene nonionic surfactant.

12. The foam forming composition of claim 1, wherein the foam forming composition further comprises at least one additive.

13. The foam forming composition of claim 12, wherein the additive is a member selected from the group consisting of blowing agents, flame retardants, deodorants, foaming catalyst, surfactant, colorant, and combinations thereof.

14. The foam forming composition of claim 13, wherein the blowing agent is pentane, a derivative thereof, or a combination thereof.

15. The foam forming composition of claim 1, wherein the functionalized natural oil component comprises from about 5% to about 35% by weight of the aromatic polyester polyol component.

16. The foam forming composition of claim 8, wherein the non-functionalized natural oil component comprises from about 3% to about 25% by weight of the aromatic polyester polyol component.

17. The foam forming composition of claim 10, wherein the nonionic surfactant comprises from about 1% to about 15% by weight, based on the combined weight of the aromatic polyester polyol component and the nonionic surfactant.

18. The foam forming composition of claim 1, wherein the active hydrogen compound is a member selected from the group consisting of alcohols, amines, glycols, carboxylic acids, derivatives thereof, and combinations thereof.

* * * * *